United States Patent
Crossman

(10) Patent No.: US 10,160,433 B2
(45) Date of Patent: Dec. 25, 2018

(54) HYDRAULIC BRAKE APPARATUS AND RELATED METHODS

(71) Applicant: Ford Global Technologies, LLC, Dearborn, MI (US)

(72) Inventor: John Crossman, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 15/271,895

(22) Filed: Sep. 21, 2016

(65) Prior Publication Data

US 2018/0079400 A1 Mar. 22, 2018

(51) Int. Cl.
*B60T 15/02* (2006.01)
*B60T 8/171* (2006.01)
*B60T 13/74* (2006.01)
*B60T 8/32* (2006.01)

(52) U.S. Cl.
CPC ............ *B60T 15/028* (2013.01); *B60T 8/171* (2013.01); *B60T 13/741* (2013.01); *B60T 13/745* (2013.01); *B60T 8/326* (2013.01)

(58) Field of Classification Search
CPC ...... B60T 8/171; B60T 13/741; B60T 15/028; B60T 17/16; B60T 13/686; B60T 16/662; B60T 8/3665
USPC .................................................. 303/3, 10, 15
See application file for complete search history.

(56) References Cited

U.S. PATENT DOCUMENTS

| 4,432,585 | A | * | 2/1984 | Nezuka ................... B60T 13/16 188/170 |
| 4,565,265 | A | | 1/1986 | Woolley |
| 5,174,338 | A | * | 12/1992 | Yokota ............... B60G 17/0152 137/625.64 |
| 5,704,693 | A | | 1/1998 | Mackiewicz |
| 6,279,689 | B1 | | 8/2001 | Zemyan |
| 6,357,480 | B1 | * | 3/2002 | Oyama ................. B60T 8/3665 137/625.65 |
| 6,375,278 | B1 | * | 4/2002 | Sauter ................... B60T 13/686 303/89 |
| 6,550,870 | B1 | * | 4/2003 | Goodzey ................ B60T 8/885 303/15 |
| 6,644,760 | B2 | * | 11/2003 | Nakano ................... B60T 8/343 188/355 |
| 6,848,753 | B2 | * | 2/2005 | Tanaka ...................... B60T 8/26 303/113.5 |
| 7,780,244 | B2 | | 8/2010 | Inagaki et al. |

(Continued)

FOREIGN PATENT DOCUMENTS

| CN | 204641722 | 9/2015 |
| JP | 2006089026 | 4/2006 |

(Continued)

*Primary Examiner* — Thomas W Irvin
(74) *Attorney, Agent, or Firm* — Frank MacKenzie; Hanley, Flight & Zimmerman, LLC

(57) ABSTRACT

Example hydraulic brake apparatus and related methods are described herein. An example apparatus disclosed herein includes a parking brake valve having an inlet fluidly coupled to a pump and an outlet fluidly coupled to a brake. The parking brake valve is operable between an open state and a closed state to allow or block fluid through the parking brake valve. To lock the fluid in the brake in a parking brake mode, the parking brake valve is moved to the closed state by pumping fluid into the inlet.

17 Claims, 22 Drawing Sheets

(56) References Cited

U.S. PATENT DOCUMENTS

| | | | |
|---|---|---|---|
| 9,016,805 B2* | 4/2015 | Ganzel | B60T 7/042 |
| | | | 188/358 |
| 9,157,543 B2* | 10/2015 | Herges | B60T 7/20 |
| 9,377,065 B2* | 6/2016 | Guillotte | B60T 10/02 |
| 9,435,428 B2* | 9/2016 | Neelakantan | F16H 61/0267 |
| 9,856,980 B2* | 1/2018 | Tachibanada | F16H 63/3483 |
| 2008/0035433 A1 | 2/2008 | Strand et al. | |
| 2010/0096576 A1* | 4/2010 | Sommer | B60T 11/30 |
| | | | 251/129.15 |
| 2016/0341311 A1* | 11/2016 | Watanabe | F16H 63/3483 |
| 2017/0036656 A1* | 2/2017 | Stoops | B60T 13/141 |
| 2018/0022333 A1* | 1/2018 | Ganzel | B60T 8/4086 |

FOREIGN PATENT DOCUMENTS

| | | |
|---|---|---|
| KR | 0184832 | 4/1999 |
| KR | 101094751 | 11/2011 |

* cited by examiner

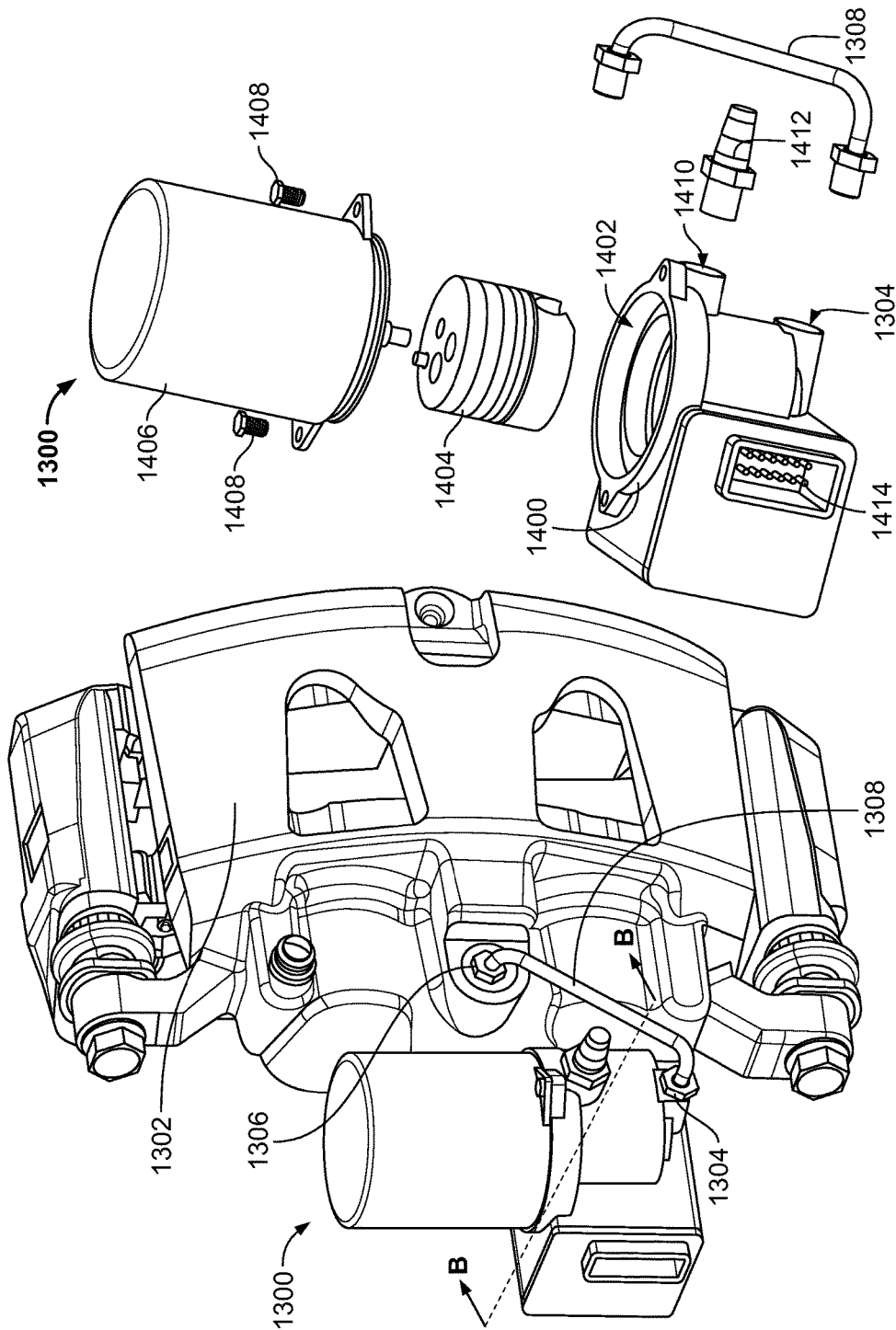

HYDRAULIC BRAKE APPARATUS AND RELATED METHODS

FIELD OF THE DISCLOSURE

This disclosure relates generally to brakes and, more particularly, to hydraulic brake apparatus and related methods.

BACKGROUND

Traditional vehicle braking systems employ a fluid-filled master cylinder and one or more brakes with slave cylinders. Fluid lines connect the master cylinder to the slave cylinders. When a driver presses on the brake pedal, a piston in the master cylinder forces brake fluid through the fluid lines to the slave cylinders, thereby causing the brakes to provide braking force against a disc or drum. Many known vehicles also include a parking brake (sometimes referred to as an emergency brake) that may be activated by a hand lever or foot pedal. The parking brake is typically connected via a brake cable directly to the brakes (or just to the rear brakes). Pulling the hand lever or pressing the foot pedal pulls the cable to cause the brake operatively coupled to the hand lever to provide braking force. In other words, parking brakes are typically a completely mechanical system that bypasses the master cylinder and other components of a hydraulic braking system.

SUMMARY

An example apparatus disclosed herein includes a parking brake valve including a first passageway between a first inlet and an outlet. The first inlet is to be in fluid communication with a pump and the outlet is to be fluidly coupled to a vehicle brake. The parking brake valve of the example apparatus also includes a second passageway between a second inlet and the first passageway. The second inlet is to be in fluid communication with a reservoir. The parking brake valve of the example apparatus further includes a shuttle having a first spool and a second spool. The second spool is disposed in the second passageway and blocks fluid flow between first passageway and the second passageway. The shuttle is movable between an open position in which the first spool allows fluid flow between the first inlet and the outlet and a closed position in which the first spool blocks fluid flow between the first inlet and the outlet. The shuttle has an orifice across the second spool fluidly connecting the first passageway to the second passageway.

An example apparatus disclosed herein includes a pump and a parking brake valve having a passageway between an inlet in fluid communication with the pump and an outlet to be in fluid communication with a vehicle brake. The parking brake valve includes a shuttle disposed in the passageway and movable between an open positon and a closed position. The parking brake valve is operable between at least: a braking mode in which the shuttle is in the open position and the pump is to direct fluid through the passageway between the inlet and the outlet; a parking brake setting mode in which the shuttle is moved to the closed position by directing the fluid, with the pump, through the inlet into the passageway; and a parking brake mode in which the shuttle is in the closed position and the fluid is captured at the outlet.

An example apparatus disclosed herein includes a parking brake valve having an inlet fluidly coupled to a pump and an outlet fluidly coupled to a brake. The parking brake valve is operable between an open state and a closed state to allow or block fluid through the parking brake valve. To lock the fluid in the brake in a parking brake mode, the parking brake valve is moved to the closed state by pumping fluid into the inlet.

BRIEF DESCRIPTION OF THE DRAWINGS

FIG. 13 illustrates another example hydraulic brake apparatus implemented with an example caliper brake and constructed in accordance with the teachings of this disclosure.

FIG. 14 is a partially exploded view of the example hydraulic brake apparatus of FIG. 13.

In FIG. 24, the example hydraulic brake apparatus is in a braking mode.

Figure 1:
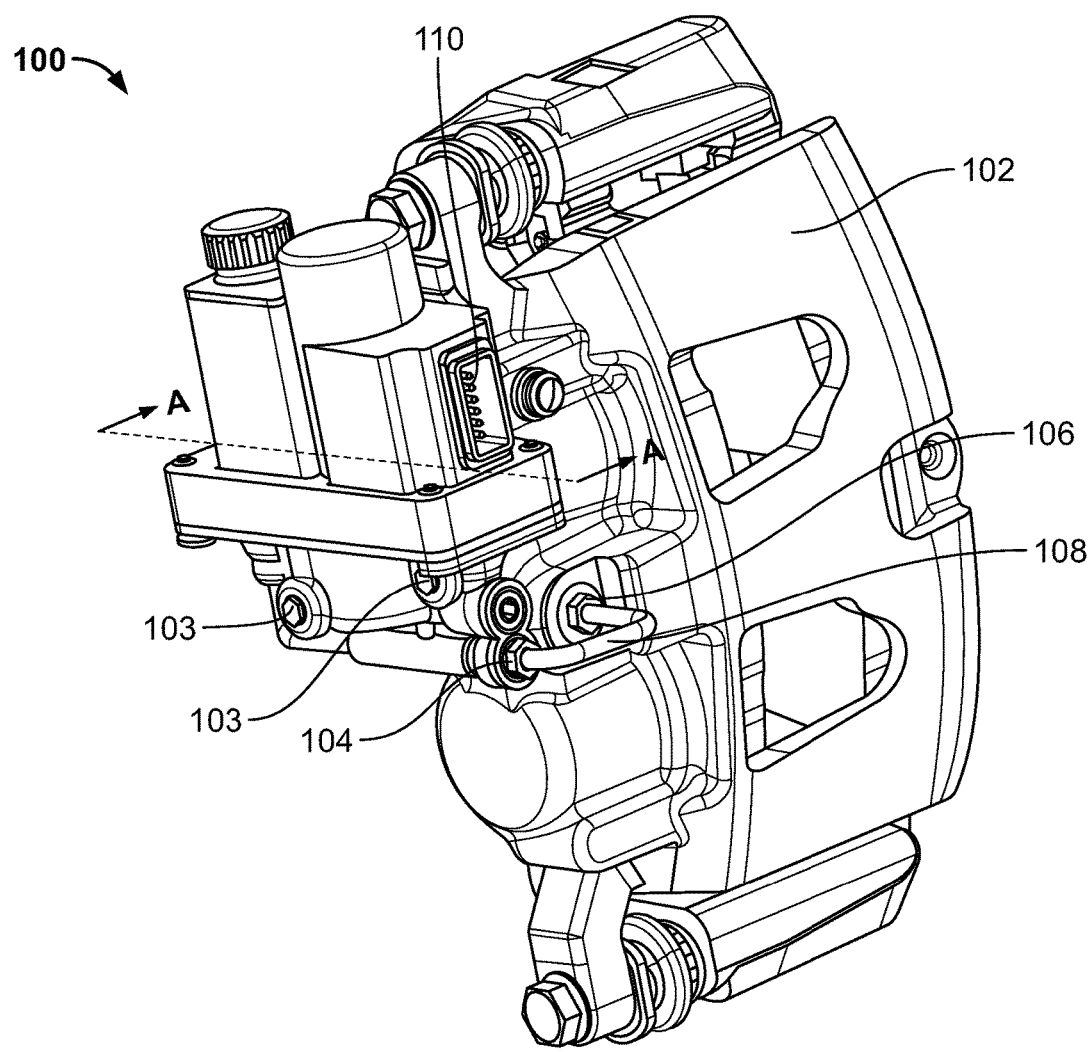
FIG. 1 illustrates an example hydraulic brake apparatus implemented with an example brake caliper and constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example hydraulic brake apparatus for use with vehicle brakes. The hydraulic brake apparatus may be implemented as standalone devices that may be coupled to or proximate a brake (e.g., a brake caliper, a drum brake, etc.) to provide pressurized hydraulic fluid to the brake. Many different types of brakes exist. Brakes typically include a brake cylinder and a piston. When pressurized hydraulic fluid is provided to a brake cylinder, a piston slidably moves, thereby applying brake pressure with a brake pad on another moving part (e.g., a rotor or drum) of a vehicle. In general, the example hydraulic brake apparatus disclosed herein include a pump, a reservoir and a parking brake valve. The hydraulic brake apparatus are operable in a braking mode (e.g., state, configuration, etc.) and a parking brake mode. In the braking mode, the pump is activated to supply high pressure fluid to the brake or to draw fluid from the brake, thereby changing the braking force applied by the brake. In the braking mode, the parking brake valve remains open (e.g., in an open state) and fluid flows through the parking brake valve based on the pressure from the pump. In some examples, the operation (e.g., the speed and/or direction) of the pump is based on a target pressure supplied by a brake controller or engine control unit (ECU) of the vehicle. Depending on the target braking pressure, the pump is activated to apply more or less pressure to the brake.

In the parking brake mode, the parking brake valve is closed (e.g., in a closed state) and high pressure fluid is locked, captured or held in the brake. In some examples, to reach the parking brake mode, the hydraulic brake apparatus is switched to a parking brake setting mode. In the parking brake setting mode, the pump is activated to supply high pressure fluid to the brake and the parking brake valve is closed to hold the high pressure fluid in the brake, thereby locking the brake in the parking brake mode. In some examples, to release the pressure at the brake, the hydraulic brake apparatus operates in a parking brake release mode where the parking brake valve is opened and the fluid and, thus, pressure in the brake is released. In some examples, to open the parking brake valve, pressure is applied to the valve that is greater than the existing brake pressure, thereby opening the valve and enabling the braking pressure to be released.

In some examples, the parking brake valve of the hydraulic brake apparatus includes a shuttle that is movable in a first passageway between an open position and a closed position to allow or block fluid flow through the first passageway. The first passageway fluidly connects an inlet to an outlet, which is fluidly coupled to the brake. The inlet is in fluid communication with the pump. Therefore, the pump may supply fluid through the first inlet and into the first passageway to the outlet.

In some examples, the shuttle includes a first spool (e.g., a plug, a seal, a flange, etc.) that is engageable with a seat in the first passageway. The shuttle also includes a second spool that is sealingly disposed in a second passageway fluidly connected to the first passageway. The second passageway is connected between a second inlet and the first passageway. In some examples, an orifice is provided in the shuttle that bypasses the second spool and fluidly connects the first passageway to the second passageway. While in the braking mode, the shuttle remains in the open position, and the pump is activated to supply high pressure fluid to the outlet (the brake) or draw fluid from the outlet as desired. To keep the shuttle in the open position, a solenoid valve is disposed in the second passageway. During the braking mode, the solenoid valve is closed to block the flow of fluid out of the second passageway. As a result, when fluid is pumped through the first passageway, the fluid in the first passageway flows through the orifice to the second passageway to balance the fluid pressure on either side of the second spool. Thus, the shuttle does not move and remains in the open positon.

When a parking brake request is received, the example hydraulic brake apparatus opens the solenoid valve in the second passageway. In some examples, the second inlet is vented or in fluid communication with a fluid reservoir. Thus, when the solenoid valve is open, the pressure in the second passageway is substantially zero. The pump is then activated to pump fluid into the first passageway to provide high pressure to the outlet (and to the brake). The high pressure fluid in the first passageway causes the shuttle to move because the pressure on one side of the second spool is higher than the pressure on the other side of the second spool. The shuttle then moves to the closed position where the first spool engages the seat in the passageway and blocks fluid flow between the first inlet and the outlet (and to the brake). In this position, high pressure fluid is locked or captured at the outlet and, thus, in the brake. In some examples, the pump continues to direct high pressure fluid to the outlet via a check valve. The pump may continue pressurizing the outlet until a target pressure is reached. Once the target pressure is reached, the hydraulic brake apparatus switches to the parking brake mode (or locked mode). In the parking brake mode, the solenoid valve in the second passageway is closed. As a result, the pressure of the fluid in the first passageway is balanced with the pressure of the fluid in the second passageway (via the orifice), which is significantly less than the pressure of the fluid at the outlet and pressing against the first spool. Thus, in the parking brake mode, high pressure fluid is locked in the outlet and, thus, in the brake.

To relieve the pressure and disengage the parking brake mode, the hydraulic brake apparatus switches to parking brake release mode. In the parking brake release mode, the pump is activated to supply fluid to the first passageway and the solenoid valve in the second passageway remains closed. When the pressure acting on one side of the first spool (from the pressure of the fluid in the first passageway) overcomes the pressure at the outlet acting on the other side of the first spool, the shuttle moves back to the open position and the fluid pressure at the outlet balances with the fluid pressure in the first passageway. The pump may relieve the pressure in the first passageway and at the outlet. Thus, the example hydraulic brake apparatus may be set in a parking brake mode by pressurizing the outlet, which causes the valve to close and lock high pressure fluid at the outlet, and may disengage the parking brake mode by directing high pressure fluid into the valve, which causes the valve to open to relieve the high pressure fluid at the outlet. In other words, the parking brake valve is operable between open state and a closed state to allow or block fluid through the parking brake valve. To lock the fluid in the brake (e.g., in the parking brake mode), the parking brake valve is moved to the closed state by pumping fluid into the inlet. To unlock the fluid in the brake (e.g., in the parking brake release mode), the parking brake valve is moved to the open state by pumping fluid into the inlet.

In some examples, the pump of the hydraulic brake apparatus is a bi-directional gear pump. The bi-directional gear pump can be activated in one direction to direct fluid to the brake (to increase braking pressure) and the reverse direction to draw fluid from the brake (to decrease or relieve braking pressure). In some examples, the hydraulic brake apparatus is controlled via an ECU or other braking system of the vehicle. The hydraulic brake apparatus may be communicatively coupled to the ECU via wiring. In other examples, the hydraulic brake apparatus communicates with the ECU wirelessly. In some examples, separate hydraulic brake apparatus may be implemented with each brake of a vehicle. The hydraulic brake apparatus can be controlled independently of each other. In some examples, each of the hydraulic brake apparatus includes a separate fluid reservoir. In other examples, two or more of the hydraulic brake apparatus share a common fluid reservoir. In some examples, the hydraulic brake apparatus may be implemented on the rear brakes of a vehicle only, while another type of braking system (e.g., a traditional master cylinder) is used on the front brakes. In other examples, all of the brakes of a vehicle may be operated by the example hydraulic brake apparatus disclosed herein.

Because the example hydraulic brake apparatus employ a fluid reservoir and a pump for pumping fluid to the brake, traditional lengthy fluid lines between a master cylinder and the brakes of the vehicle are no longer needed. Likewise, jounce hoses and other associated parts (e.g., brackets) that are used with traditional braking systems can be eliminated. Thus, the example hydraulic brake apparatus reduce manufacturing and maintenance costs related to the braking system. Further, the example hydraulic brake apparatus eliminate parking brake hardware (e.g., levers, cables, brackets, etc.) that are typically required in known systems. Further, by reducing these component(s), the weight added to the vehicle is substantially less. Additionally, the design labor, inventory management and assembly operations associated with these traditional mechanical parking brakes can be eliminated.

In the illustrated examples disclosed herein, various fluid ports or openings are referred to as inlets and outlets. However, it is understood that fluid may flow in either direction through these openings. As such, in some instances, an outlet may be considered an inlet or an inlet may be considered an outlet, depending on the direction of fluid flow.

FIG. 1 illustrates an example hydraulic brake apparatus 100 constructed in accordance with the teachings of this disclosure. In the illustrated example, the hydraulic brake apparatus 100 is implemented with an example caliper 102 (e.g., a brake) for a vehicle. The example hydraulic brake apparatus 100 includes a fluid reservoir and a pump (disclosed in further detail herein) to pump fluid into or out of the caliper 102 for applying or relieving braking pressure. In the illustrated example, the hydraulic brake apparatus 100 is coupled to an outside of the caliper 102 (e.g., to a body or housing of the caliper 102) via bolts 103. An outlet 104 (e.g., a fluid port) of the hydraulic brake apparatus 100 is fluidly coupled to a fluid port 106 of the caliper 102 via a fluid line 108 (e.g., a flex hose). The hydraulic brake apparatus 100 pumps fluid into the caliper 102 or draws fluid out of the caliper 102, thereby controlling the braking operations of the caliper 102. While the hydraulic brake apparatus 100 illustrated in FIG. 1 is coupled to an outside of the caliper 102, in other examples the hydraulic brake apparatus 100 is integrated into the housing or casting of the caliper 102. In other examples, the hydraulic brake apparatus 100 may be mounted adjacent the caliper 102 (e.g., on the axle, on the strut or hub, on the frame of the vehicle, etc.) and fluidly coupled to the brake caliper via a fluid line (e.g., the fluid line 108). In other examples, the outlet 104 may be fluidly coupled directly to the fluid port 106 of the caliper 102 (and, thus, no fluid line 108 is used).

Figure 2:
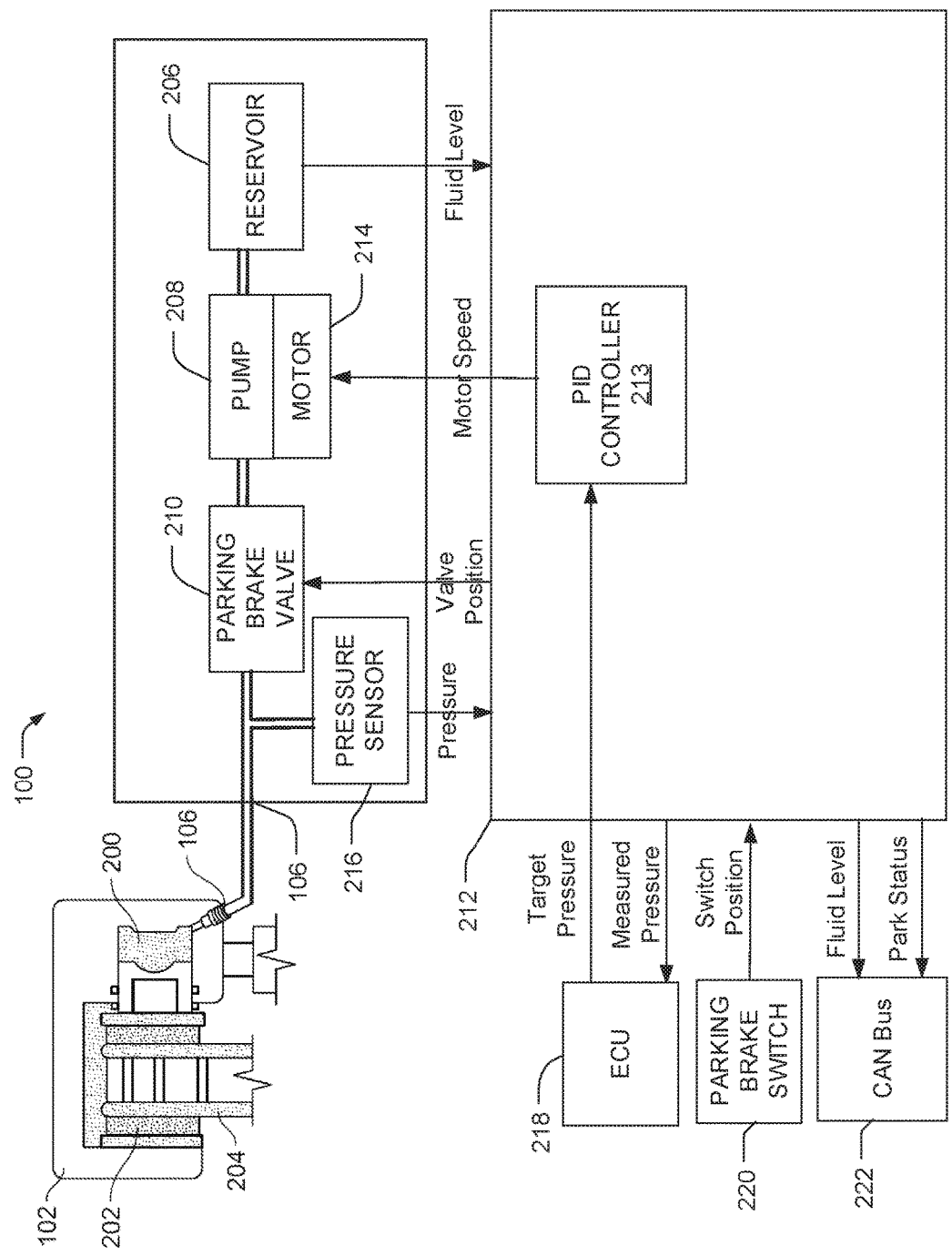
FIG. 2 is a schematic of the example hydraulic brake apparatus of FIG. 1 and an example engine control unit (ECU) for controlling the example hydraulic brake apparatus.

An example schematic of the hydraulic brake apparatus 100 is illustrated in FIG. 2. In the illustrated example, the fluid port 106 on the caliper 102 leads to a fluid cylinder 200 in the caliper 102. When fluid is directed into the fluid cylinder 200, the caliper 102 closes, thereby pressing one or more brake pads 202 against a brake disc 204, and when fluid is directed out of the fluid cylinder 200, the caliper 102 opens, thereby allowing the brake disc 204 to spin freely.

In the illustrated example of FIG. 2, the hydraulic brake apparatus 100 includes a reservoir 206 (e.g., an accumulator, tank, etc.), a pump 208 and a parking brake valve 210. To apply braking pressure, the pump 208 directs fluid from the reservoir 206, through the parking brake valve 210, to the outlet 104, which is fluidly coupled to the caliper 102. To relieve braking pressure, the pump 208 operates in a reverse direction and draws fluid from the outlet 104 (from the caliper 102), through the parking brake valve 210 and back into the reservoir 206.

In the illustrated example, an ECU 212 (e.g., a hydraulic brake apparatus controller) is provided to control the hydraulic brake apparatus 100. For example, to control the amount of fluid pressure applied to the caliper 102, the ECU 212 controls a speed and/or direction of a motor 214 that drives the pump 208. In particular, in the illustrated example, the ECU 212 includes a proportional-integral-derivative (PID) controller 213 that controls the speed and direction of the motor 214 (and, thus, the pump 208) to produce a pressure at the outlet 104 that matches a target pressure. The pressure at the outlet 104 is measured by a pressure sensor 216. The target or desired braking pressure is provided by an engine control unit (ECU) 218 (e.g., a primary brake controller, a braking ECU, etc.). In some examples, the target pressure may be based on one or more safety systems/applications. For example, the vehicle may implement an automatic braking system that detects when an object is approaching and automatically applies the brake(s). In such an example, the ECU 218 transmits a target braking pressure to the ECU 212. Additionally or alternatively, the target pressure may be based on a desired braking as instructed by the driver (e.g., via the brake pedal). The PID controller 213 determines the difference between the target pressure and the pressure at the outlet 104 and generates a motor speed signal (e.g., a pulse width modulate (PWD)) to drive the pump 208 to generate the target pressure. The pump 208 can be driven in one direction to apply pressure to the outlet 104 and driven in the opposite direction to relieve or reduce pressure at the outlet 104. Thus, the PID controller 213 controls the speed of the motor 214 (and, thus, the pump 208) to direct fluid into the caliper 102 or out of the caliper 102 until the target pressure is reached.

As disclosed further herein, the example hydraulic brake apparatus 100 can operate in a braking mode to provide braking pressure as desired and in a parking brake mode in which fluid is locked in the caliper 102. To switch the hydraulic brake apparatus 100 into the parking brake mode, an operator activates a parking brake switch 220. The ECU 212 communicates the desired valve positon to the parking brake valve 210 and controls the motor 214, as discussed in further detail herein.

In the illustrated example, the ECU 212 receives a fluid level signal from the reservoir 206 (e.g., via the fluid level sensor 404 of FIG. 4) indicating the level of liquid in the reservoir. The fluid level and/or a status of the parking brake valve 210 may be communicated via a controller area network (CAN) bus 222 to any other system (e.g., the ECU 218, the vehicle dashboard (for display), to a diagnostics system, etc.). In the illustrated example, the ECU 212 communicates the measured pressure (e.g., obtained by the pressure sensor 216) to the ECU 218.

The ECU 218 communicates with the ECU 212 via a CAN. A connector may be coupled between the ECU 218 and the ECU 212. For example, as illustrated in FIG. 1, the hydraulic brake apparatus 100 includes a male connector 110 (e.g., a pin connector), which receives a female connector of a cable or other wiring communicatively coupled to the ECU 218. In other examples, the male and females connectors may be reversed. Additionally or alternatively, in some examples, the hydraulic brake apparatus 100 includes a wireless transceiver, which wirelessly communicates with the ECU 218. While the ECU 212 and the ECU 218 are depicted as separated blocks, in other examples, the ECU 212 and the ECU 218 may be combined or implemented by the same system. The ECU 212 and/or the ECU 218 may be implemented by hardware, software, firmware and/or any combination of hardware, software and/or firmware. Thus, for example, the ECU 212 and/or the ECU 218 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Figure 3:
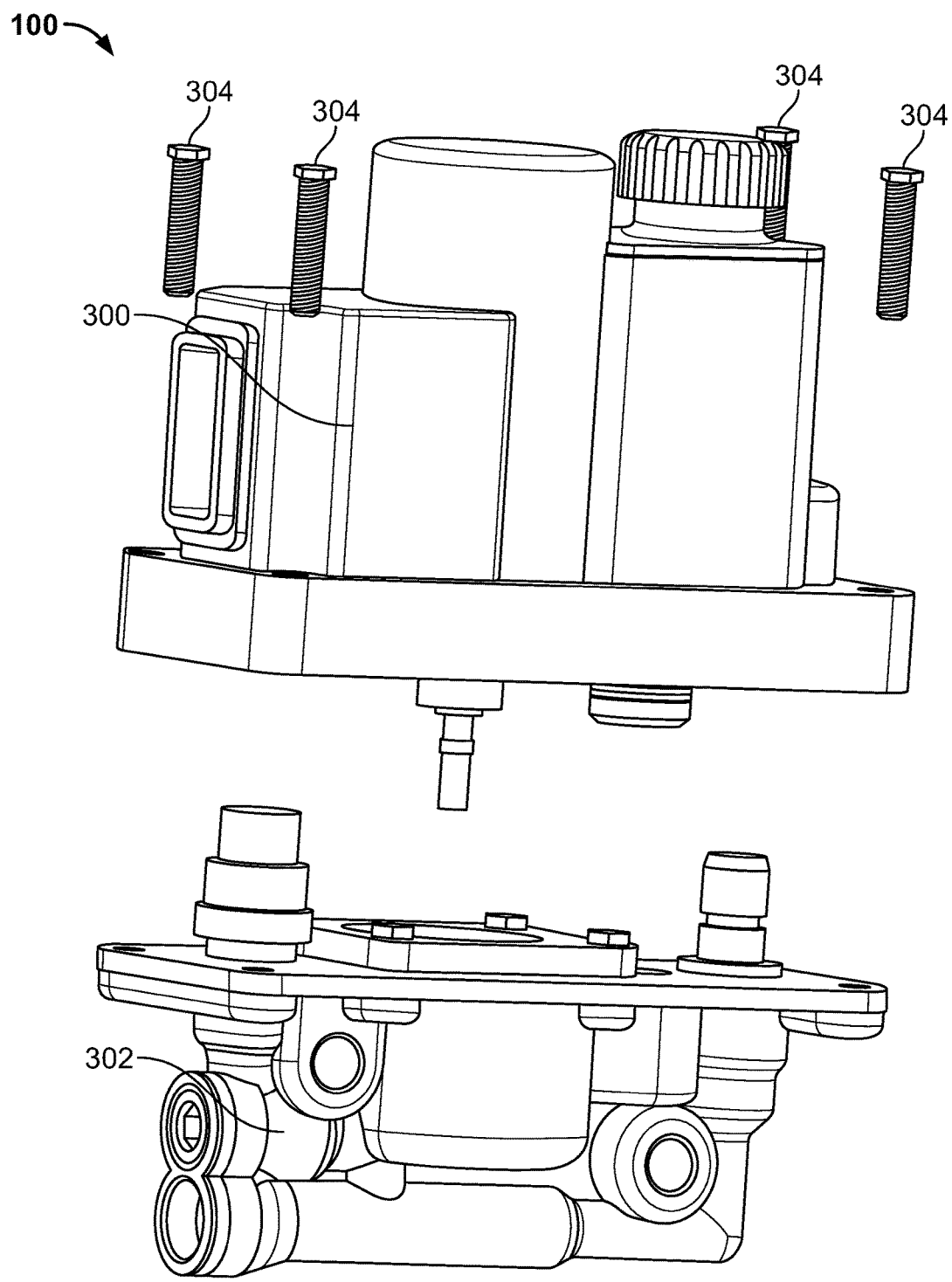
FIG. 3 is a partially exploded view of the example hydraulic brake apparatus of FIG. 1 having an example upper housing and an example lower housing.

In some examples, the ECU 212 is disposed in the hydraulic brake apparatus 100 (e.g., in the motor sub-assembly 300 or the pump sub-assembly 302 of FIG. 3, disclosed in further detail herein). In other examples, the ECU 212 is separate from the hydraulic brake apparatus 100 and communicatively coupled to the hydraulic brake apparatus 100 (e.g., via the male connector 110). In some examples, the ECU 212 controls multiple ones of the hydraulic brake apparatus 100 (e.g., two rear brake calipers). In some examples, the ECU 218 communicates the target brake pressure to multiple ones of the ECU 212 and, thus, to separate ones of the hydraulic brake apparatus 100.

Figure 4:
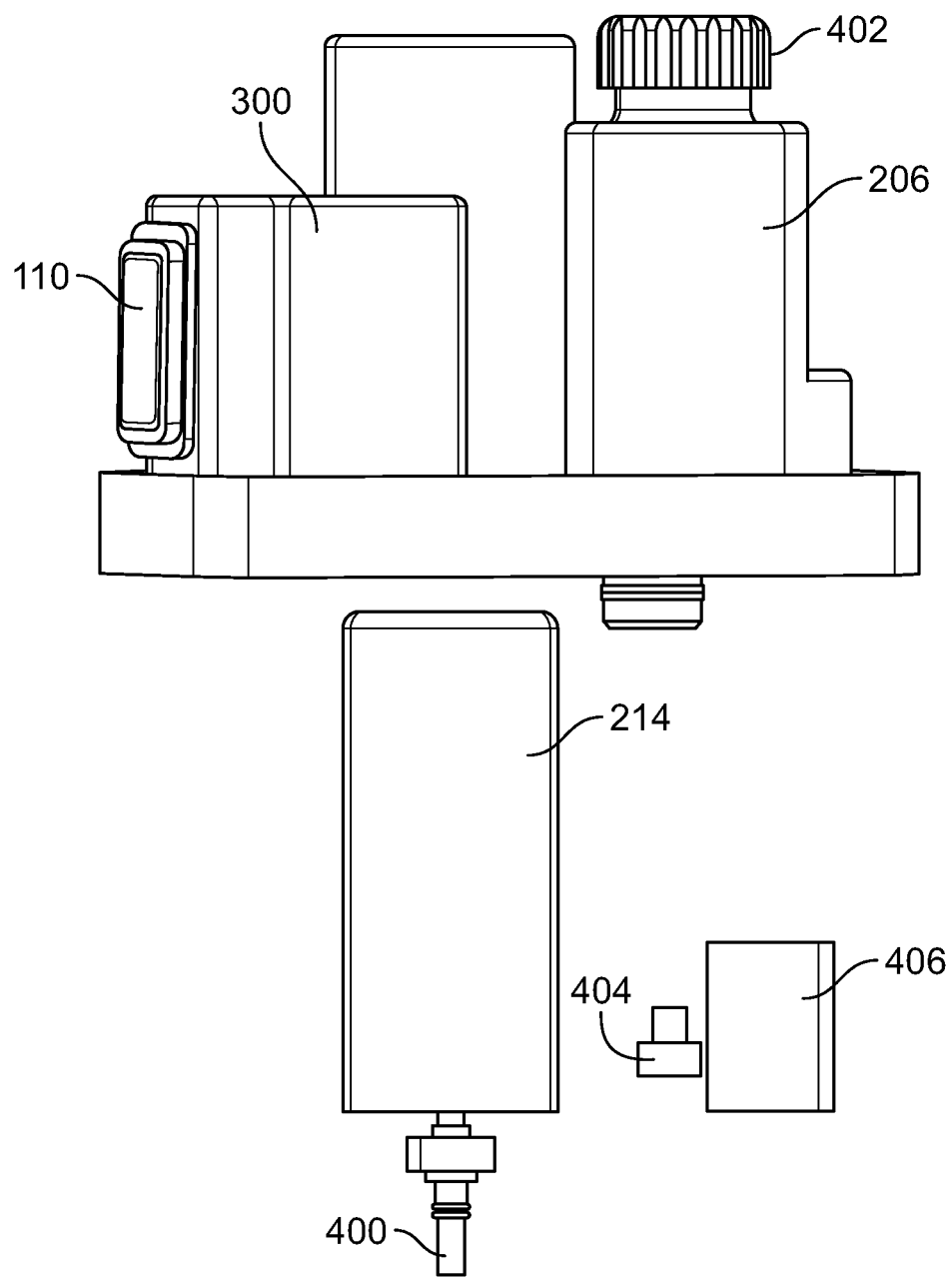
FIG. 4 is a partially exploded view of the example upper housing of FIG. 3.
Figure 5:
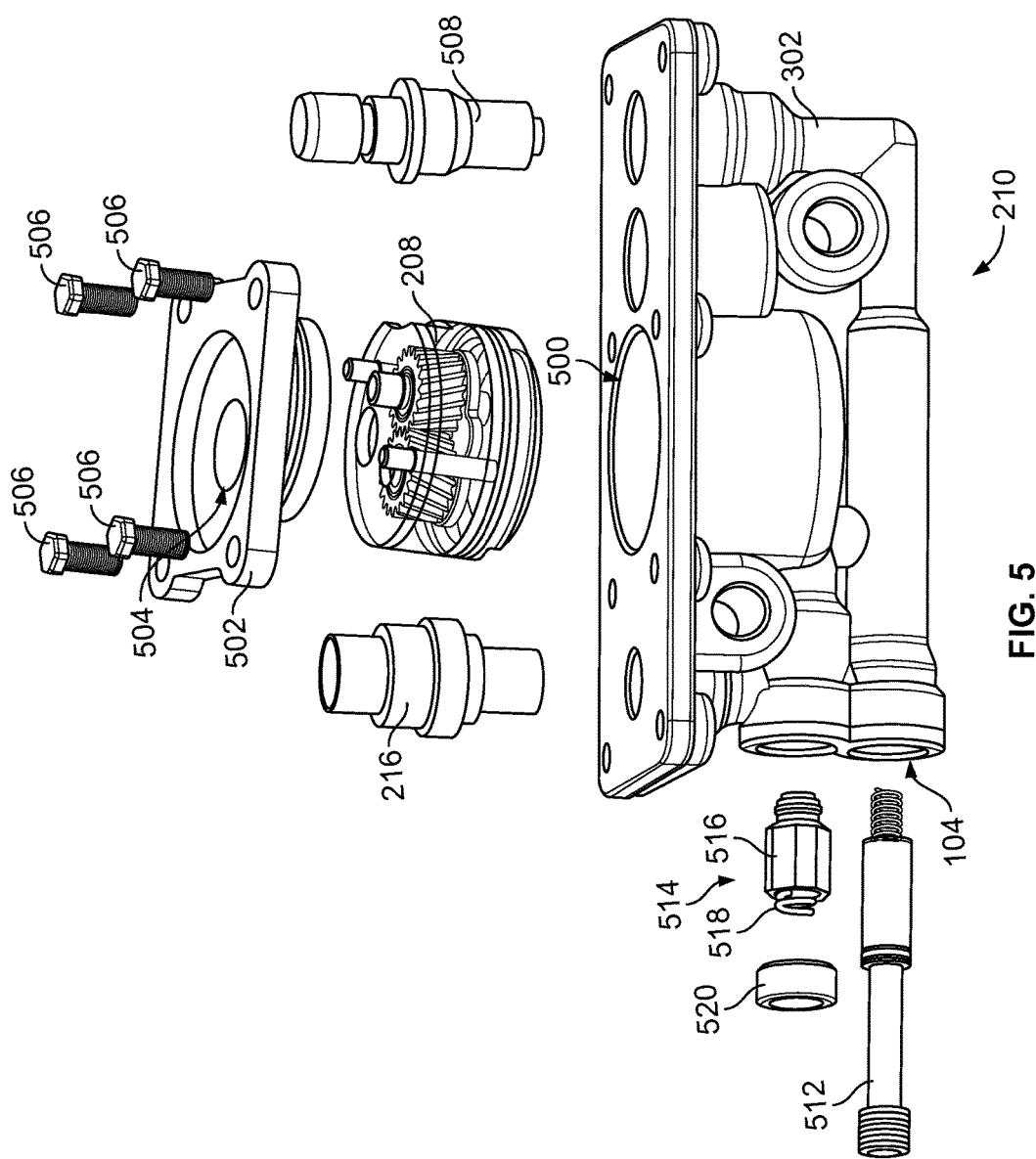
FIG. 5 is a partially exploded view of the example lower housing of FIG. 3.

FIGS. 3-5 are partially exploded views of the components of the example hydraulic brake apparatus 100. As illustrated in the example of FIG. 3, the hydraulic brake apparatus 100 includes a motor sub-assembly 300 (e.g., a first housing) and a pump sub-assembly 302 (e.g., a second housing). In the illustrated example, the motor sub-assembly 300 and the pump sub-assembly 302 are coupled via a plurality of bolts 304. In other examples, other mechanical fastener(s) may be used in addition to or as an alternative to the bolts 304 to couple the motor sub-assembly 300 and the pump sub-assembly 302.

In the illustrated example of FIG. 4, the motor sub-assembly 300 includes the reservoir 206, which includes hydraulic fluid (e.g., brake fluid), the motor 214 for driving the pump 208 (FIG. 2), and the male connector 110. The motor 214 has an output shaft 400 and is electrically coupled to the male connector 110. In the illustrated example, a cap 402 is provided on the reservoir 206. The cap 402 may be removed to add or remove hydraulic fluid to/from the reservoir 206. A fluid level sensor 404 is provided to measure the level of fluid in the reservoir 206, which is communicated to the ECU 212 as illustrated in FIG. 2. Also illustrated in FIG. 4 is a solenoid winding 406, described in further detail herein.

In the illustrated example of FIG. 5, the pump 208 is disposed within a pump bore 500 in the pump sub-assembly 302. The motor 214 (FIG. 4) drives the pump 208. A retaining plate 502 is coupled to the pump sub-assembly 302 over the pump bore 500. The output shaft 400 of the motor 214 (FIG. 4) extends through an opening 504 in the retaining plate 502 and connects to the pump 208. In the illustrated example, the retaining plate 502 couples to the pump sub-assembly 302 via a plurality of bolts 506. In other examples, other mechanical fastener(s) may be used in addition to or as an alternative to the bolts 506 to couple the retaining plate 502 to the pump sub-assembly 302.

Also illustrated in the example of FIG. 5 is a pin 508, which forms a solenoid valve with the solenoid winding 406 (FIG. 4) (disclosed in further detail herein), and the pressure sensor 216. As described above, the hydraulic brake apparatus 100 (FIG. 1) includes the parking brake valve 210. The parking brake valve 210 includes a shuttle 512 to block or allow fluid flow to the outlet 104. Also illustrated in FIG. 5 is a check valve 514 (e.g., a relief valve). The check valve 514 includes a plug 516, a spring 518 and a retainer 520, disclosed in further detail herein.

Figure 6:
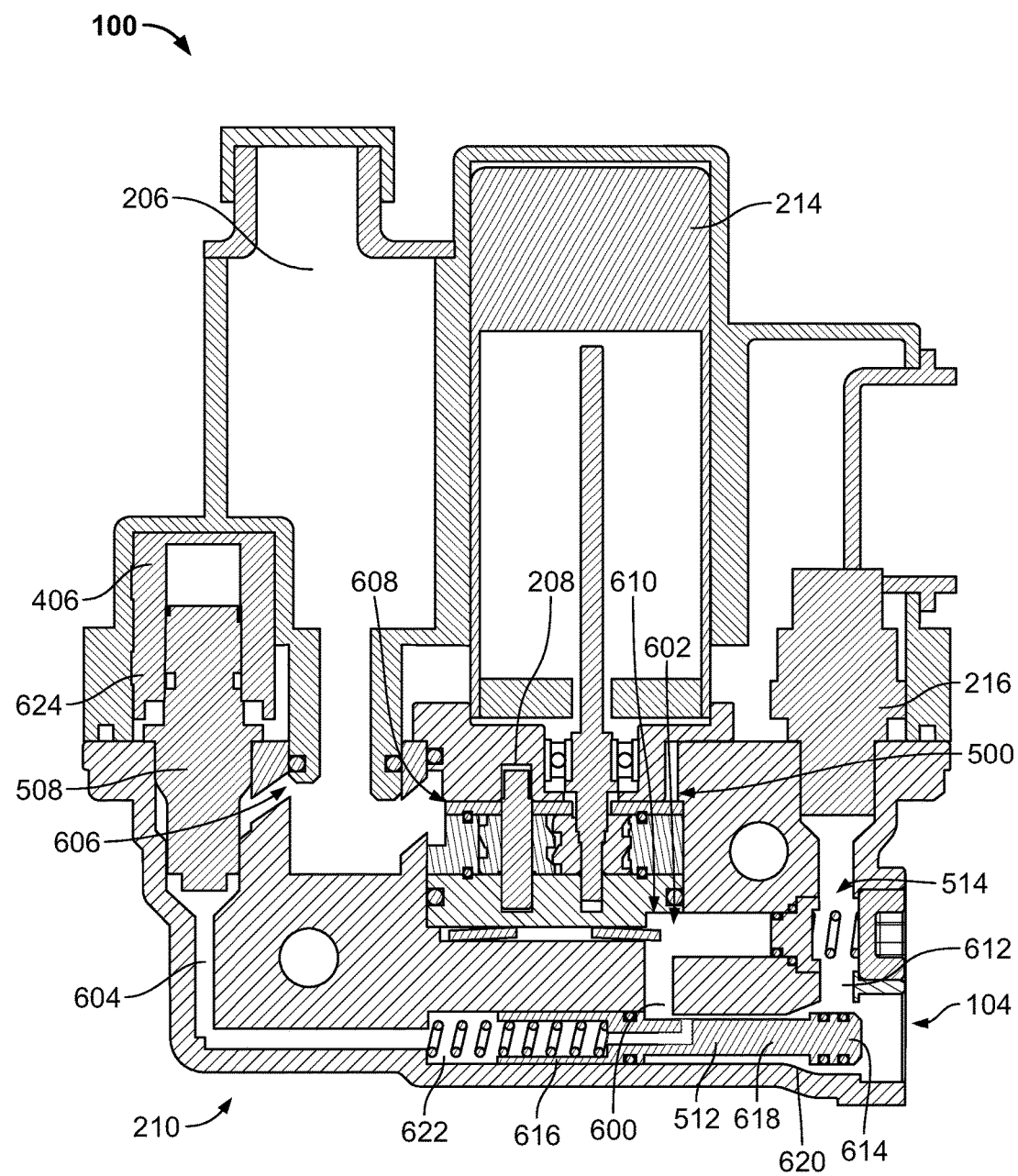
FIG. 6 is a cross-sectional view of the example hydraulic brake apparatus of FIG. 1 taken along line A-A of FIG. 1.

FIG. 6 is a cross-sectional view of the hydraulic brake apparatus 100 taken along line A-A of FIG. 1. In the illustrated example, the parking brake valve 210 includes a first passageway 600 between a first inlet 602 (e.g., a first port) and the outlet 104 (e.g., a second port). The parking brake valve 210 also includes a second passageway 604 between a second inlet 606 (e.g., a third port) and the first passageway 600. In the illustrated example, the first passageway 600 is L-shaped (e.g., includes a substantially 90° turn). In other examples, the first passageway 600 may be shaped differently.

In the illustrated example, the pump 208 includes a pump inlet 608 (e.g., a pump inlet) in fluid communication with the reservoir 206 and a pump outlet 610 in fluid communication with the first inlet 602 of the parking brake valve 210. In the illustrated example, the first inlet 602 is formed in the bottom of the pump bore 500. In one direction, the motor 214 drives the pump 208 to supply fluid from the reservoir 206 to the pump outlet 610 and, thus, to the first inlet 602. In the reverse direction, the motor 214 drives the pump 208 to return fluid from the pump outlet 610 (and, thus, the first inlet 602) to the reservoir 206.

In the illustrated example, the parking brake valve 210 includes a bypass passageway 612 (e.g., a third passageway) between the first inlet 602 and the outlet 104. The check valve 514 is disposed in the bypass passageway 612. In the illustrated example, the pressure sensor 216 is in fluid communication with the outlet 104 to measure a pressure of the fluid at the outlet 104. In the illustrated example, the parking brake valve 210 includes the shuttle 512, which is movable within the first and second passageways 600, 604. In particular, the shuttle 512 includes a first spool 614 and a second spool 616 connected by a stem 618. The first and second spools 614, 616 may be referred to as collars or seals. The first spool 614 is disposed in the first passageway 600 and the second spool 616 is between the second passageway 604. The second spool 616 is sealingly disposed in the second passageway 604. The second spool 616 is slidable within the second passageway 604 to block fluid flow between the first and second passageways 600, 604.

In the illustrated example, the shuttle 512 is movable between an open position (the position shown in FIG. 6) in which fluid is able to flow through the first passageway 600 between the first inlet 602 and the outlet 104 and a closed positon in which fluid is blocked from flowing through the first passageway 600 between the first inlet 602 and the outlet 104. In particular, in the open position, the first spool 614 is spaced apart from an inner wall 620 of the first passageway 600. In the closed position the shuttle 512 is moved into the second passageway 604 (to the left) such that the first spool 614 sealingly engages the inner wall 620, thereby blocking the flow of fluid in the first passageway 600 between the first inlet 602 and the outlet 104. In the illustrated example, the shuttle 512 is biased via a spring 622 to the open position (to the right in FIG. 6). The first and second spools 614, 616 may include one or more seals (e.g., o-rings).

In the illustrated example, the second inlet 606 is fluidly coupled to the reservoir 206. A solenoid valve 624, formed by the solenoid winding 406 and the pin 508, is disposed in the second passageway 604. The solenoid valve 624 operates between an open position (a first position) in which fluid is able to flow through the solenoid valve 624 and a closed position (a second position) in which fluid is blocked from flowing through the solenoid valve 624. In some examples, the position of the solenoid 624 is based on an instructions from the ECU 212 (FIG. 2). In the illustrated example, the solenoid winding 406 is energized to move the pin 508 in the second passageway 604. In other examples, other types of valves may instead be implemented.

Figure 7:
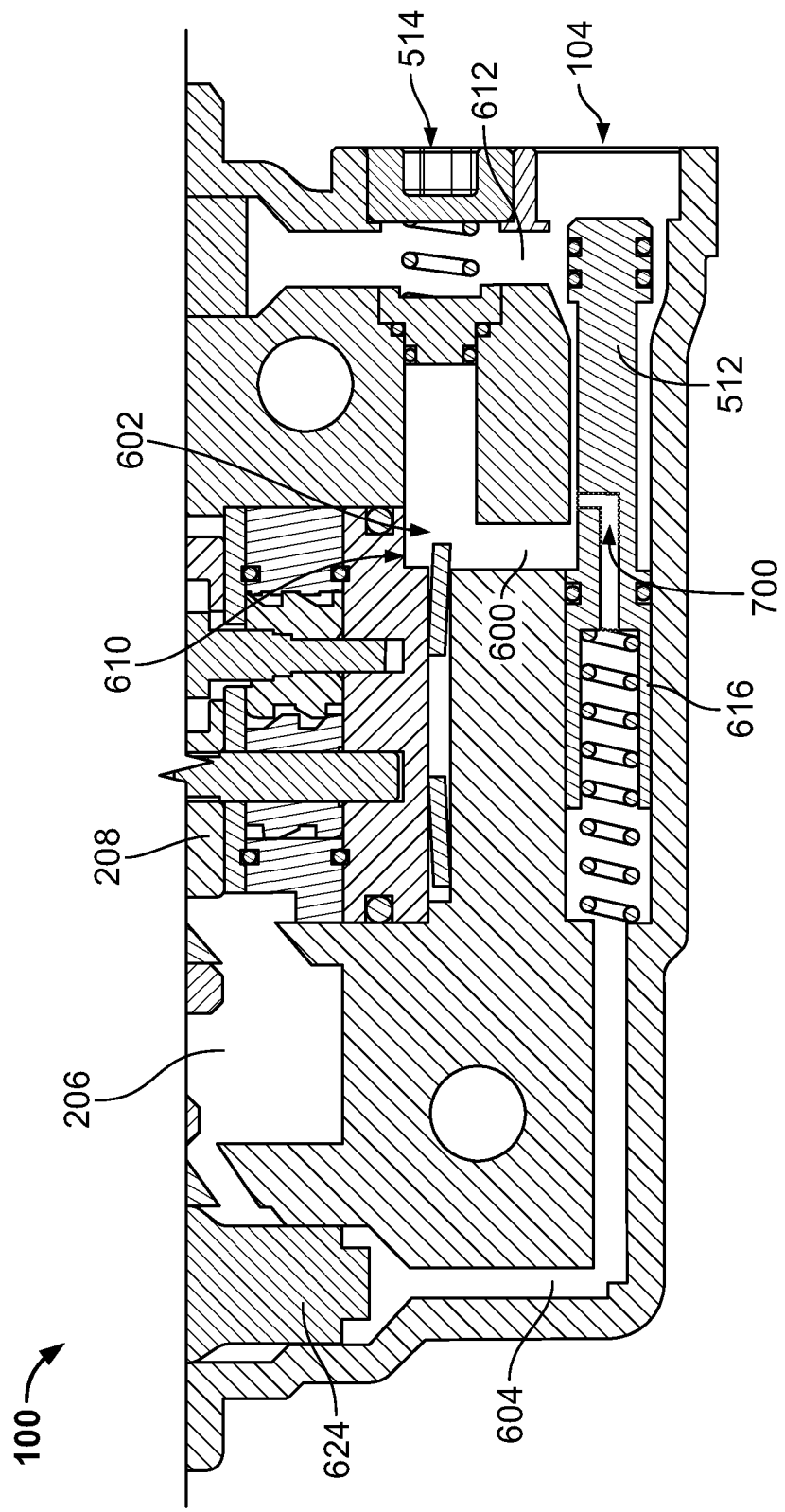
FIG. 7 shows the cross-sectional view of FIG. 6 with the example hydraulic brake apparatus in a braking mode.

The example hydraulic brake apparatus 100 is operable to apply brake pressure to the caliper 102 (FIG. 1) in a braking mode and operable to lock fluid in the caliper 102 in a parking brake mode. FIG. 7 illustrates the example hydraulic brake apparatus 100 in the braking mode. In the braking mode, the solenoid valve 624 is in the closed position, such that fluid cannot flow through the solenoid valve 624 between the reservoir 206 and the second passageway 604. To apply braking pressure to the caliper 102 (FIG. 1), the motor 214 (FIG. 6) is activated to the drive the pump 208, which directs high pressure fluid out the pump outlet 610 to the first inlet 602, through the first passageway 600, and to the outlet 104, where the fluid is supplied to the caliper 102 (FIGS. 1 and 2). To relieve braking pressure at the caliper 102, the motor 214 (FIG. 6) is activated to drive the pump 208 in the opposite direction, thereby drawing fluid from the first passageway 600 (and the caliper 102) and directing the fluid back into the reservoir 206. In the braking mode, the shuttle 512 remains in the open position because the pressure on both sides of the second spool 616 is balanced. To balance the pressure across the second spool 616, the shuttle 512 includes an orifice 700 (e.g., a small passageway) that extends through the shuttle 512 and fluidly couples the first passageway 600 and the second passageway 604. In particular, the orifice 700 creates a flow path that bypasses the second spool 616. The fluid in the first passageway 600 flows through the orifice 700 into the second passageway 604, which is blocked by the solenoid valve 624. Thus, the pressure on both sides of the second spool 616 balances. As a result, the shuttle 512 does not move and remains in the open position.

Figure 8:
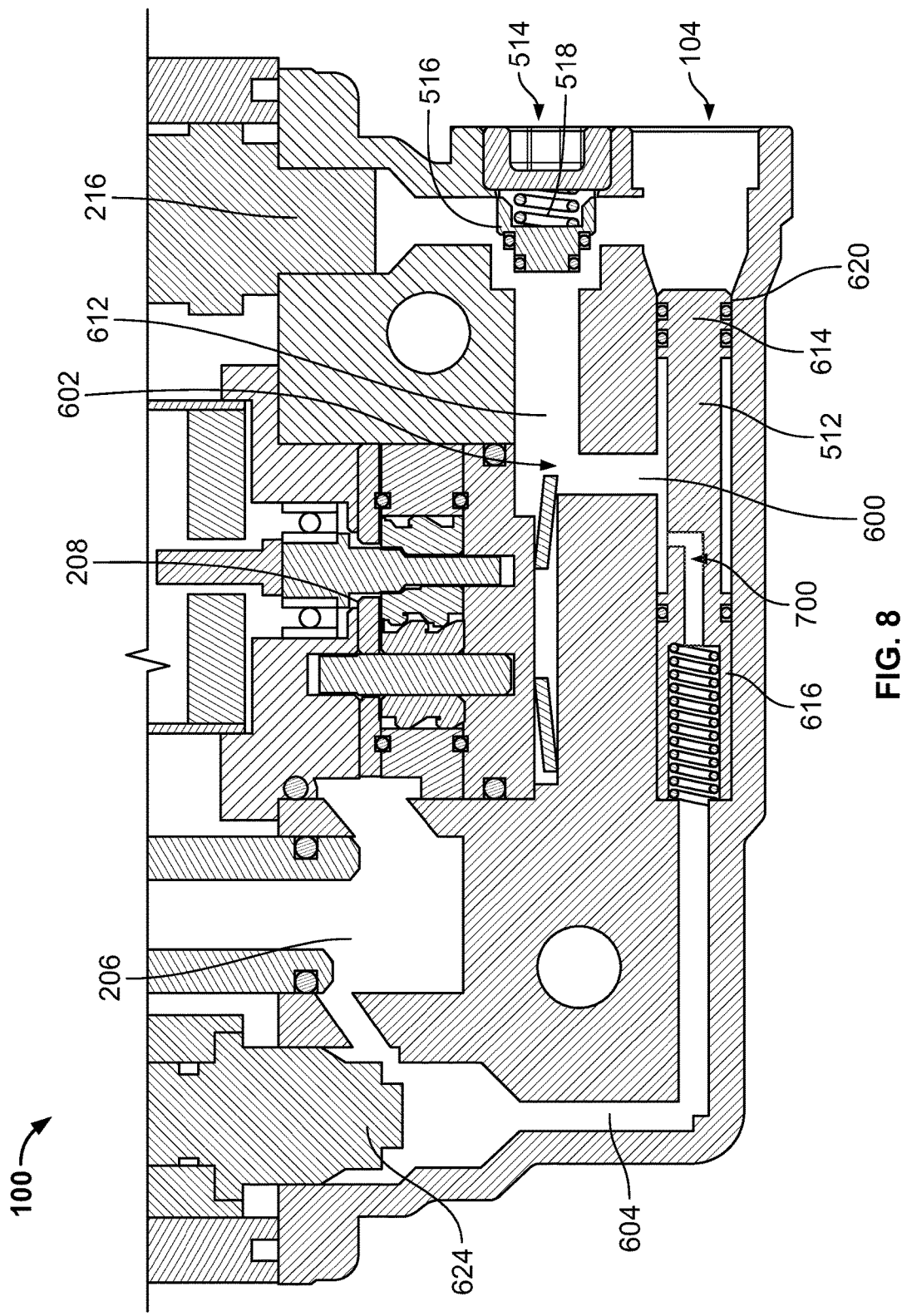
FIG. 8 shows the cross-sectional view of FIG. 6 with the example hydraulic brake apparatus in a parking brake setting mode.

If the parking brake mode is requested (e.g., via the parking brake switch 220 (FIG. 2)), the hydraulic brake apparatus 100 operates in a parking brake setting mode, as illustrated in FIG. 8. In the parking brake setting mode, the solenoid valve 624 is opened, which allows fluid in the second passageway 604 to flow to the reservoir 206. The motor 214 (FIG. 6) is activated to drive the pump 208 to direct high pressure fluid through into the first inlet 602, which flows through the first passageway 600 to the outlet 104 (as illustrated in FIG. 7). The high pressure fluid in the first passageway 600 also flows through the orifice 700 to the second passageway 604. However, because of the small size of the orifice 700 (e.g., one square millimeter), a pressure drop across the orifice 700 is generated. In the illustrated example, the orifice 700 is not shown to scale. In particular, the orifice 700 has been enlarged for illustrative purposes. The pressure drop across the orifice 700 results in a higher pressure on the right side of the second spool 616 (the side facing the first passageway 600) than the left side of the second spool 616. As a result, the shuttle 512 moves from the open position (FIG. 7) to the closed position illustrated in FIG. 8, where the first spool 614 engages the inner wall 620 of the first passageway 600 and blocks fluid flow through the first passageway 600 between the first inlet 602 and the outlet 104. Thus, high pressure fluid is locked at the outlet 104 and in the caliper 102 (FIG. 1). To bring the pressure at the outlet 104 higher (e.g., to the target pressure), the pump 208 continues to direct high pressure fluid into the first inlet 602, which flows through the check valve 514 in the bypass passageway 612 to the outlet 104. In particular, the high pressure at the first inlet 602 overcomes the force of the spring 518, thereby moving the plug 516 to the open positon in FIG. 8 and allowing fluid to flow through the bypass passageway 612 to the outlet 104. The pump 208 continues to pump high pressure fluid to the outlet 104 until the target pressure is reached (as detected by the pressure sensor 216).

Figure 9:
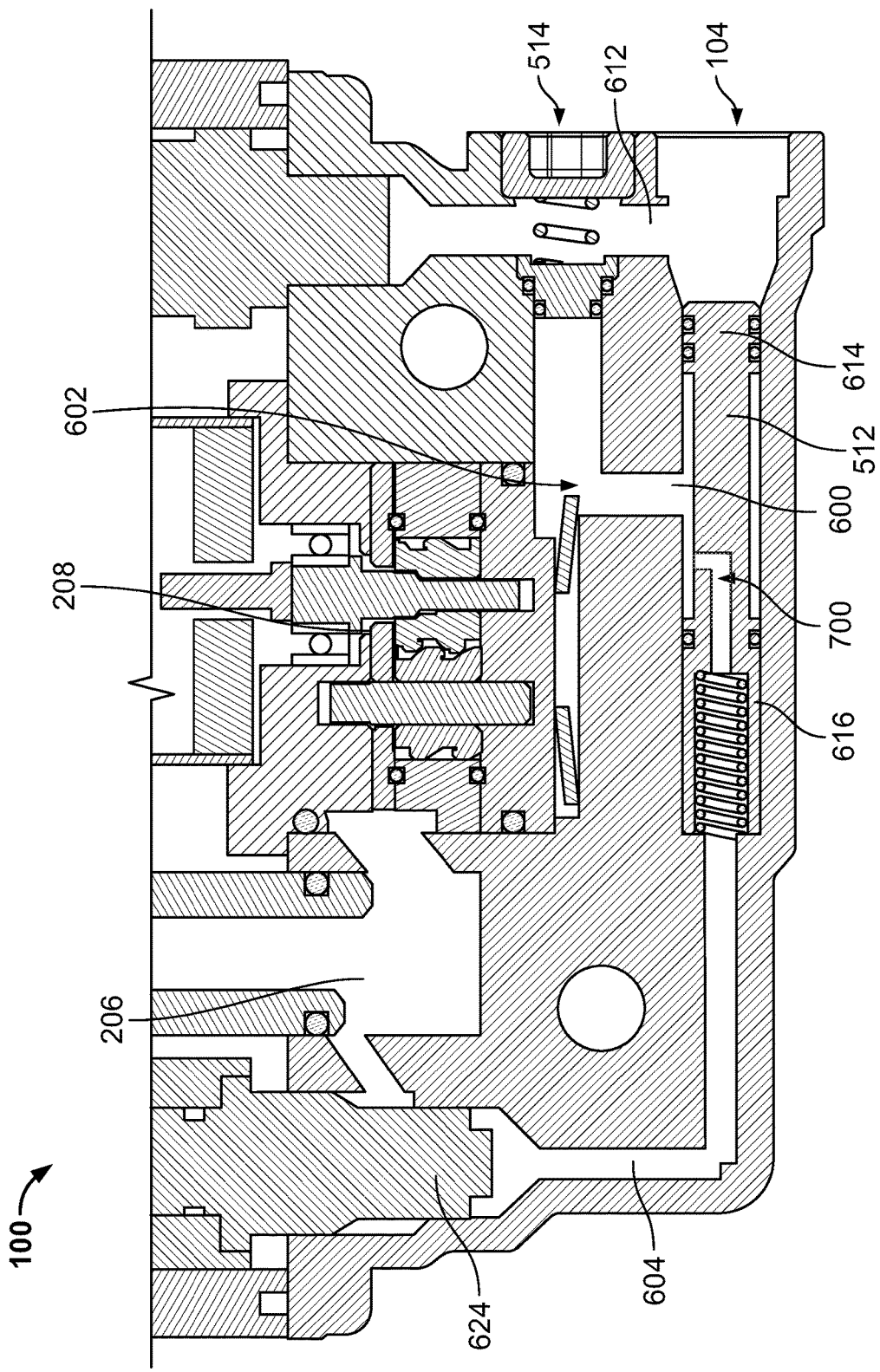
FIG. 9 shows the cross-sectional view of FIG. 6 with the example hydraulic brake apparatus in a parking brake mode.

When the target pressure is reached at the outlet 104, the hydraulic brake apparatus 100 is switched to the parking brake mode, as illustrated in FIG. 9. In the parking brake mode, the pump 208 is deactivated. As a result, the check valve 514 closes, thereby locking the high pressure fluid at the outlet 104 and, thus, in the caliper 102 (FIG. 1). Additionally, the solenoid valve 624 is closed, thereby preventing fluid flow through the second passageway 604 to the reservoir 206. The fluid in the first passageway 600 flows through the orifice 700 into the second passageway 604 until the pressure balances. As a result, the pressure on both sides of the second spool 616 is substantially the same, and substantially less than the pressure of the fluid at the outlet 104. The higher pressure fluid at the outlet 104 (acting on the right side of the first spool 614) maintains the shuttle 512 in the closed position.

Figure 10:
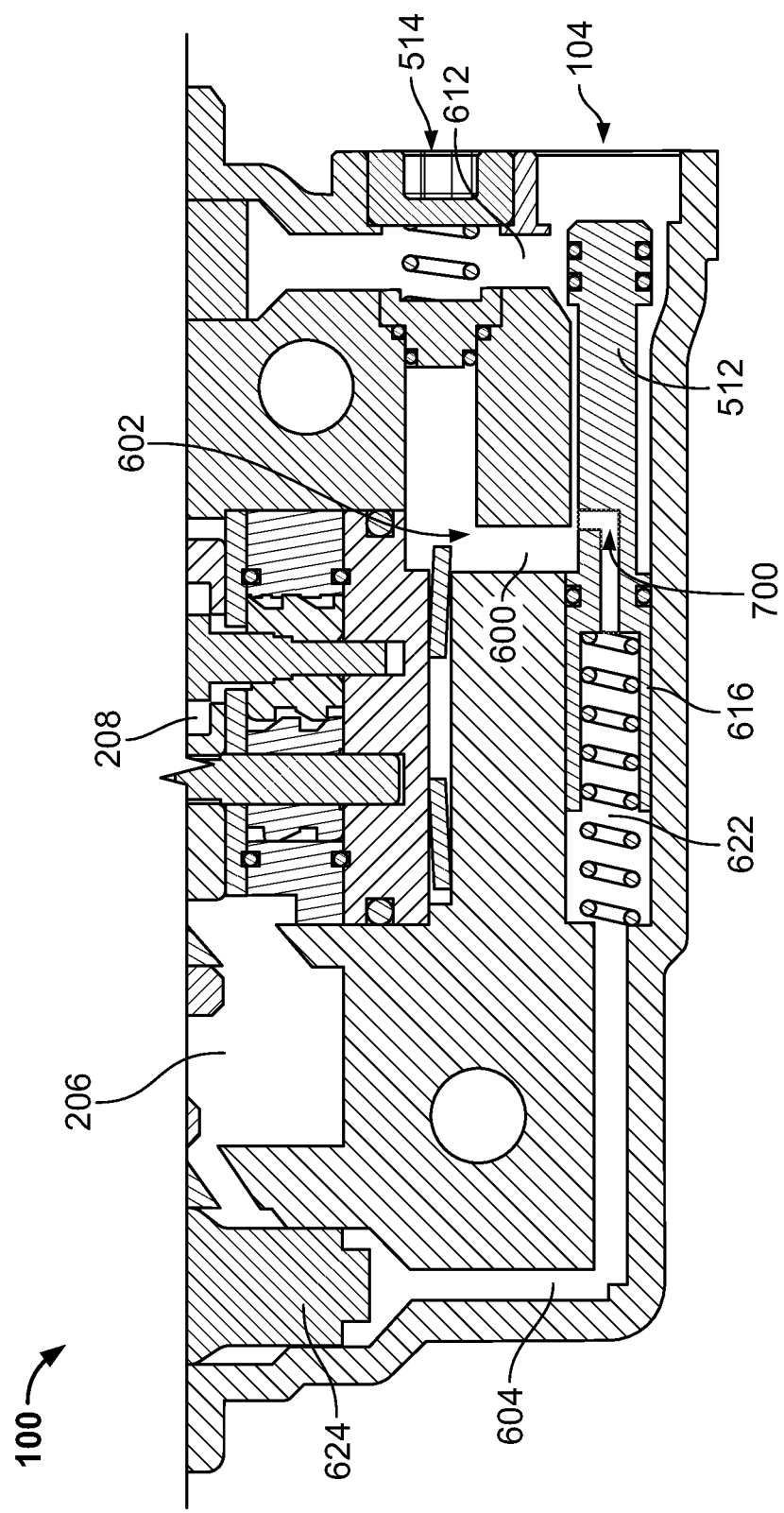
FIG. 10 shows the cross-sectional view of FIG. 6 with the example hydraulic brake apparatus a parking brake release mode.

To release or deactivate the parking brake mode, the pump 208 is activated to direct high pressure fluid into the first inlet 602. As shown in FIG. 10, when the pressure in the first passageway 600 is sufficiently high, the combination of the pressure in the first passageway 600 and the pressure from the spring 622 overcomes the pressure at the outlet 104, which causes the shuttle 512 to move to the open position (to the right in FIG. 10). Once the shuttle 512 is in the open position, the pressure in the first passageway 600 and the pressure at the outlet 104 balances. The fluid can then be pumped back into the reservoir 206 to relieve the pressure in the caliper 102 (FIG. 1). At this point, the hydraulic brake apparatus 100 can again operate in the brake mode or be switched to the parking brake mode, as disclosed above.

As illustrated in the example of FIGS. 6-10, the pump 208 and the second passageway 604 are fluidly coupled to the reservoir 206. In other examples, a separate reservoir may be provided for the pump 208. In the illustrated example, the orifice 700 (FIGS. 7-10) is disposed in the shuttle 512. In other examples, the orifice 700 may be provided in a channel formed in the parking brake valve 210 (e.g., in the pump sub-assembly 302 (FIG. 3)) that bypasses the second spool 616. In some examples, another pressure reducing device (e.g., a pressure regulator) may be used in addition to or as an alternative to the orifice 700. In the illustrated example of FIGS. 6-10, the check valve 514 is provided in the bypass passageway 612. In other examples, the check valve 514 may be disposed in the shuttle 512 (e.g., similar to the check valve 2600 and in the shuttle 2412 of FIG. 26, disclosed in further detail herein), and may be arranged to allow fluid flow across the first spool 614 to the outlet when the shuttle 512 is in the closed position.

Figure 12:
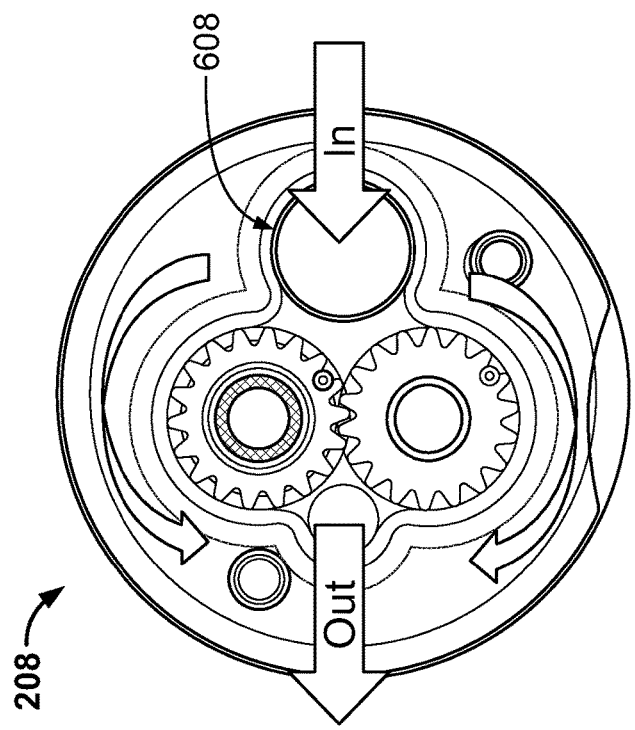
FIG. 12 is a top view of the example pump of FIG. 11.
Figure 11:
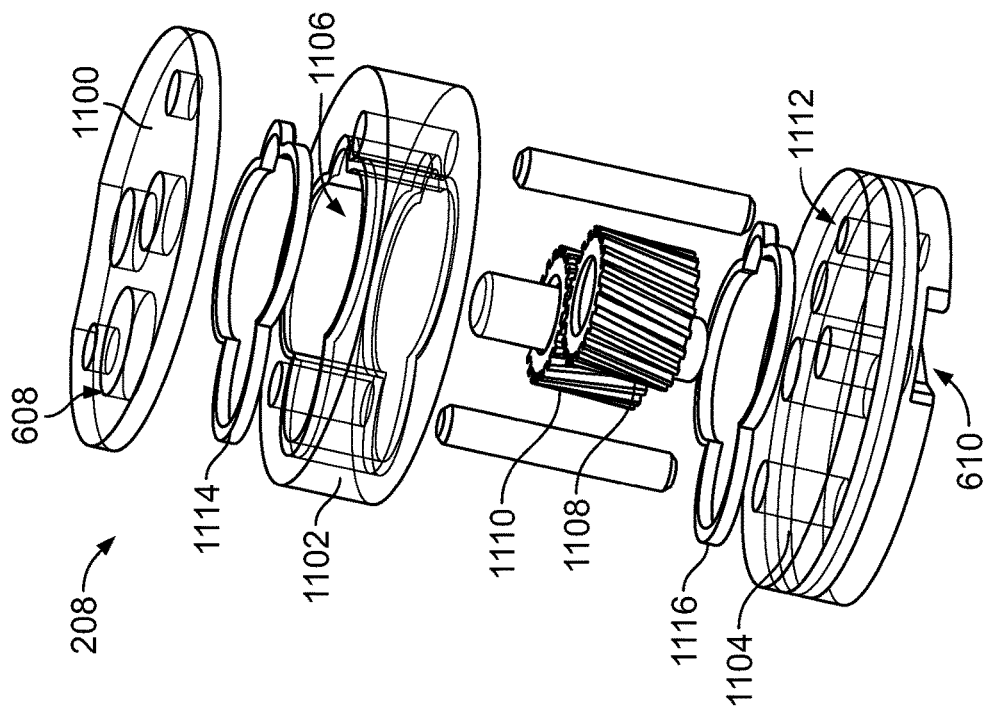
FIG. 11 is an exploded view of an example pump implemented in the example hydraulic brake apparatus of FIG. 1.

FIG. 11 is an exploded view of the example pump 208 and FIG. 12 is a top view of the pump 208. As illustrated in FIG. 11, the pump 208 includes a top plate 1100, a gear housing 1102 and a bottom plate 1104. Fluid enters the top plate 1100 through the pump inlet 608 (FIGS. 11 and 12), which is an opening formed in the top plate 1100, and flows into a cavity 1106 formed in the gear housing 1102. A first gear 1108 and a second gear 1110 are disposed in the cavity 1106. The first gear 1108 and the second gear 1110 are meshed. The motor 214 (FIG. 4) drives the first gear 1108, which rotates the second gear 1110. When rotating in one direction, the first and second gears 1108, 1110 pump fluid from the pump inlet 608 in the top plate 1100 to an opening 1112 in the bottom plate 1104 that connects to the pump outlet 610 (as illustrated in FIG. 12). When rotating in the opposite direction (the reverse direction), the first and second gears 1108, 1110 pump fluid from the opening 1112 in the bottom plate (from the pump outlet 610) to the pump inlet 608 in the top plate 1100 (opposite that illustrated in FIG. 12). To enhance sealing between the top and bottom plates 1100, 1104 and the gear housing 1102, a first gasket 1114 (e.g., a seal) is disposed between the top plate 1100 and the gear housing 1102 and a second gasket 1116 is disposed between the bottom plate 1104 and the gear housing 1102. In other examples, more or fewer gaskets may be implemented. In the illustrated example of FIGS. 2-12, the pump 208 is implemented as a bi-directional gear pump. However, in other examples, the pump 208 may be implemented as another type of pump such as a vane pump, a centrifugal pump, etc.

FIG. 13 illustrates another example hydraulic brake apparatus 1300. In the illustrated example, the hydraulic brake apparatus 1300 is implemented with an example caliper 1302 (e.g., a brake) for a vehicle, which may be substantially the same as the caliper 102 of FIG. 1. The example hydraulic brake apparatus 1300 includes a fluid reservoir and a pump (disclosed in further detail herein) to pump fluid into or out of the caliper 1302 for applying or relieving braking pressure. In the illustrated example, the hydraulic brake apparatus 1300 is coupled to an outside of the caliper 1302 (e.g., to a body or housing of the caliper 1302). An outlet 1304 (e.g., a fluid port) of the hydraulic brake apparatus 1300 is fluidly coupled to a fluid port 1306 of the caliper 1302 via a fluid line 1308. The hydraulic brake apparatus 1300 pumps fluid into the caliper 1302 or draws fluid out of the caliper 1302, thereby controlling the braking of the caliper 1302. In some examples, the hydraulic brake apparatus 1300 is integrated into the housing or body of the caliper 1302. In other examples, the hydraulic brake apparatus 1300 may be mounted adjacent the caliper 1302 (e.g., on the axle, on the strut or hub, on the frame of the vehicle, etc.). In other examples, the outlet 1304 may be coupled directly to the fluid port 1306 of the caliper 1302 (and, thus, no fluid line 1308 is used).

In the illustrated example of FIG. 14, the hydraulic brake apparatus 1300 includes a housing 1400 having a bore 1402, a pump cartridge 1404 that is disposed within the bore 1402, and a motor 1406 for driving a pump (the pump 1600 of FIG. 16) of the pump cartridge 1404. The motor 1406 is coupled to the housing 1400 via bolts 1408. In other examples, other mechanical fastener(s) may be used in addition to or as an alternative to the bolts 1408 to couple the motor 1406 and the housing 1400. In the illustrated example, the housing 1400 includes the outlet 1304, which directs fluid to and from the caliper 1302 (FIG. 13) via the fluid line 1308. The housing 1400 includes a reservoir inlet 1410, which is fluidly coupled to a fluid reservoir. The reservoir may be coupled to the housing 1400 or may be in a remote location. A nozzle 1412 may be disposed in the reservoir inlet 1410 for receiving a fluid line coupled to the reservoir. The hydraulic brake apparatus 1300 includes a female connector 1414 (e.g., a pin connector), which receives a male connector of a cable communicatively coupled to an ECU (such as the ECU 212 of FIG. 2). In other examples, the hydraulic brake apparatus 1300 includes a wireless transceiver, which communicates with the ECU. The example hydraulic brake apparatus 1300 communicates with the ECU 212 and operates substantially the same as the example hydraulic brake apparatus 100 shown in the schematic in FIG. 2.

Figure 15:
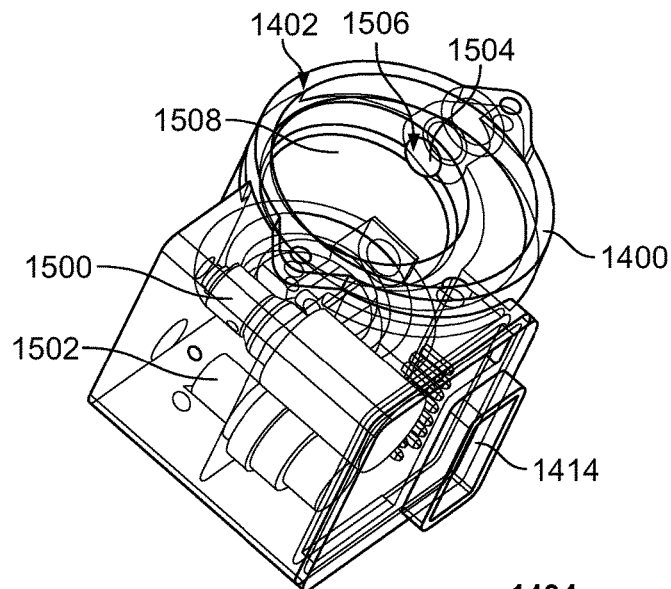
FIG. 15 is a perspective view of an example housing of the example hydraulic brake apparatus of FIG. 13.

As illustrated in FIG. 15, the hydraulic brake apparatus 1300 (FIG. 13) includes a solenoid valve 1500 and a pressure sensor 1502 disposed in the housing 1400. The motor 1406 (FIG. 14), the solenoid valve 1500 and the pressure sensor 1502 are connected to the female connector 1414. A reservoir passageway 1504 extends between the reservoir inlet 1410 (FIG. 14) and an opening 1506 in an inner wall 1508 of the bore 1402.

Figure 16:
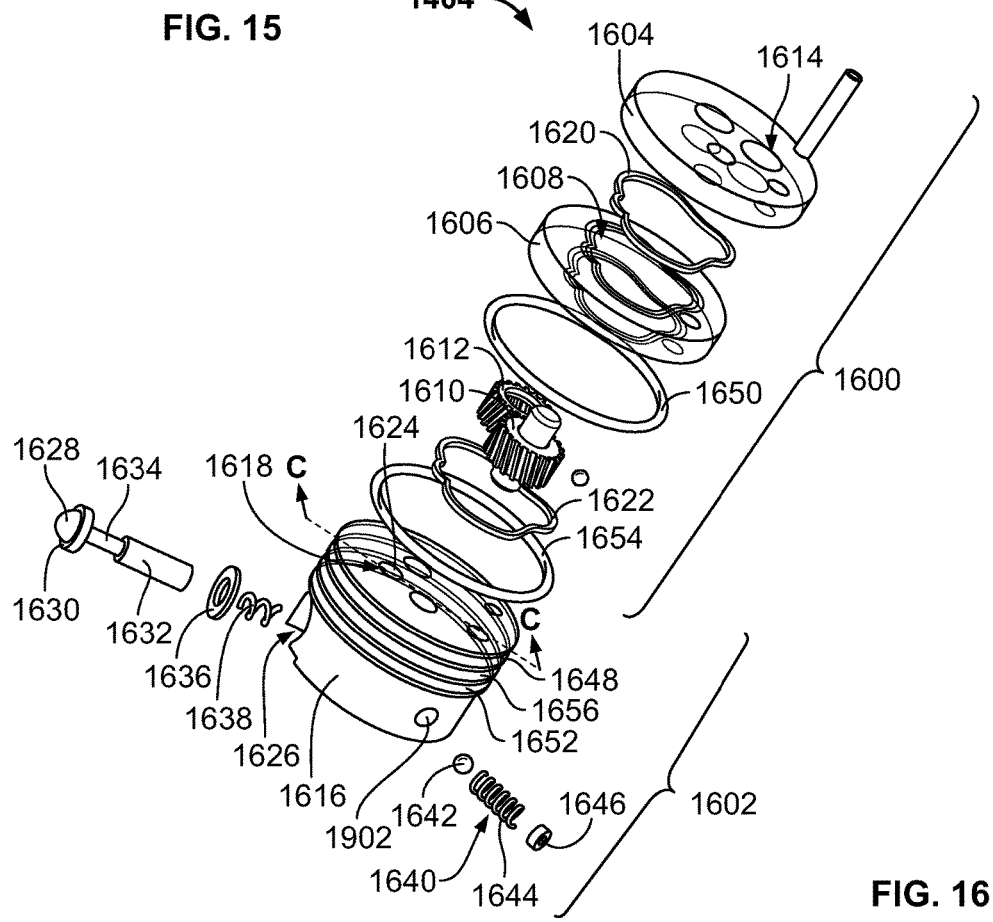
FIG. 16 is an exploded view of an example pump cartridge of the example hydraulic brake apparatus of FIG. 13 including an example pump and an example parking brake valve.

FIG. 16 is an exploded view of the pump cartridge 1404. The pump cartridge 1404 includes a pump 1600 and a parking brake valve 1602. In the illustrated example, the pump 1600 is a gear pump. The pump 1600 includes a top plate 1604, a gear housing 1606 having a gear cavity 1608, and a first gear 1610 and a second gear 1612 disposed within the gear cavity 1608. The first gear 1610 and the second gear 1612 are meshed. The motor 1406 (FIG. 14) drives the first gear 1610, which rotates the second gear 1612. Fluid from the reservoir enters the top plate 1604 through an inlet 1614 and flows into the gear cavity 1608. In particular, as illustrated in FIG. 15, the opening 1506 for the reservoir passageway 1504 is near an upper section of the bore 1402. When the pump cartridge 1404 is disposed in the bore 1402, the reservoir fluid fills the upper portion of the bore 1402 around the pump 1600, such that fluid flows into the inlet 1614 in the top plate 1604.

The parking brake valve 1602 includes a valve body 1616 having a first inlet 1618. Fluid from the gear cavity 1608 flows into the valve body 1616 through the first inlet 1618. To enhance sealing, a first gasket 1620 is disposed between the top plate 1604 and the gear housing 1606 and a second gasket 1622 is disposed between the gear housing 1606 and the valve body 1616. In other examples, more or fewer gaskets may be implemented.

Figure 17:
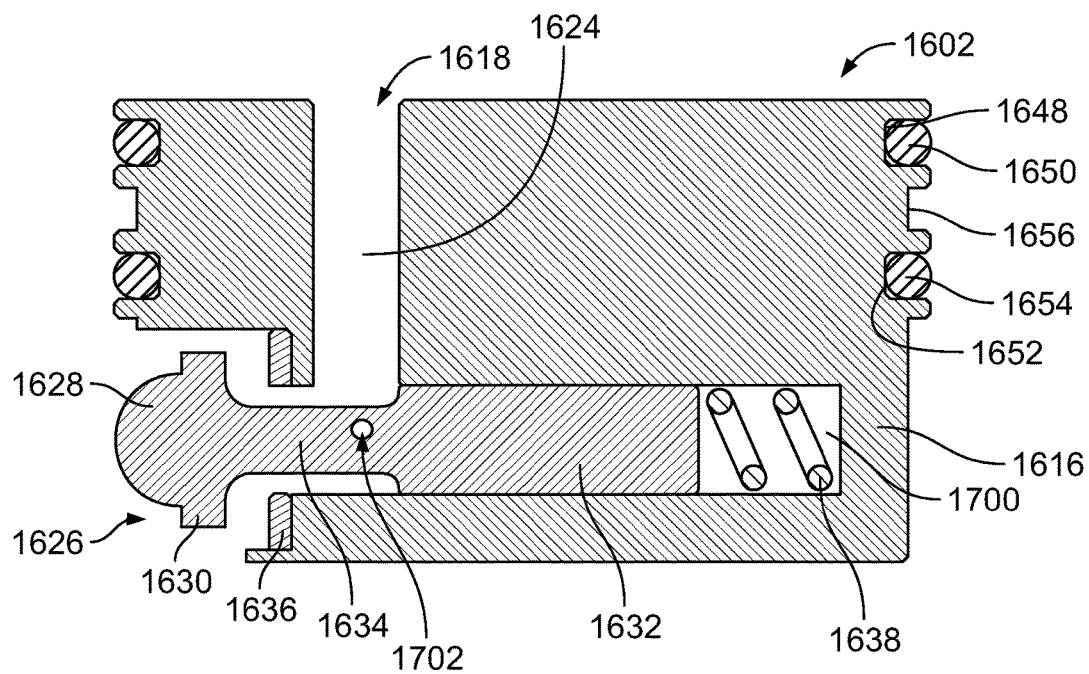
FIG. 17 is a cross-sectional view of the example parking brake valve of FIG. 16 taken along line C-C of FIG. 16 and showing an example shuttle in an open positon.

Referring to FIGS. 16 and 17, a first passageway 1624 couples the first inlet 1618 to outlet 1626 in the valve body 1616. The outlet 1626, is in fluid communication with the outlet 1304 (FIG. 13) of the hydraulic brake apparatus 1300 and, thus, is in fluid communication with the caliper 1302. In the illustrated example, the parking brake valve 1602 includes a shuttle 1628 to block or allow fluid flow through the first passageway 1624. In particular, the shuttle 1628 is movable between an open position (the position shown in FIG. 6) in which fluid is able to flow through the first passageway 1624 (between the first inlet 1618 and the outlet 1626) and a closed position in which fluid is blocked from flowing through the first passageway 1624. The shuttle includes a first spool 1630 and a second spool 1632 coupled by a stem 1634. The first spool 1630 is movable toward and away from a seat ring 1636 to block or allow fluid flow through the first passageway 1624. For example, as illustrated in the open position in FIG. 17, the first spool 1630 is spaced from the seat ring 1636. The shuttle 1628 is biased toward the open position via a spring 1638. The shuttle 1628 is movable to the closed position, as illustrated in the position in FIG. 18, in which the first spool 1630 sealingly engages the seat ring 1636 and prevents fluid flow through the first passageway 1624. Referring back to FIG. 16, the parking brake valve 1602 includes a check valve 1640 that includes a plug 1642, a spring 1644 and a retainer 1646, which are disclosed in further detail herein.

Figure 18:
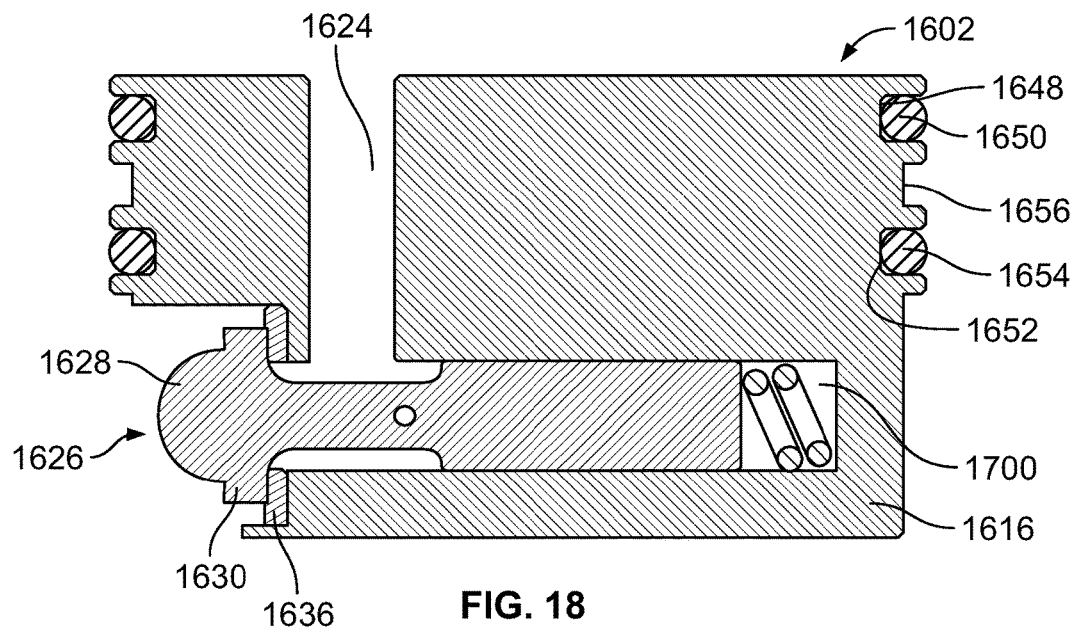
FIG. 18 shows the cross-sectional view of FIG. 17 with the example shuttle in the closed position.
Figure 19:
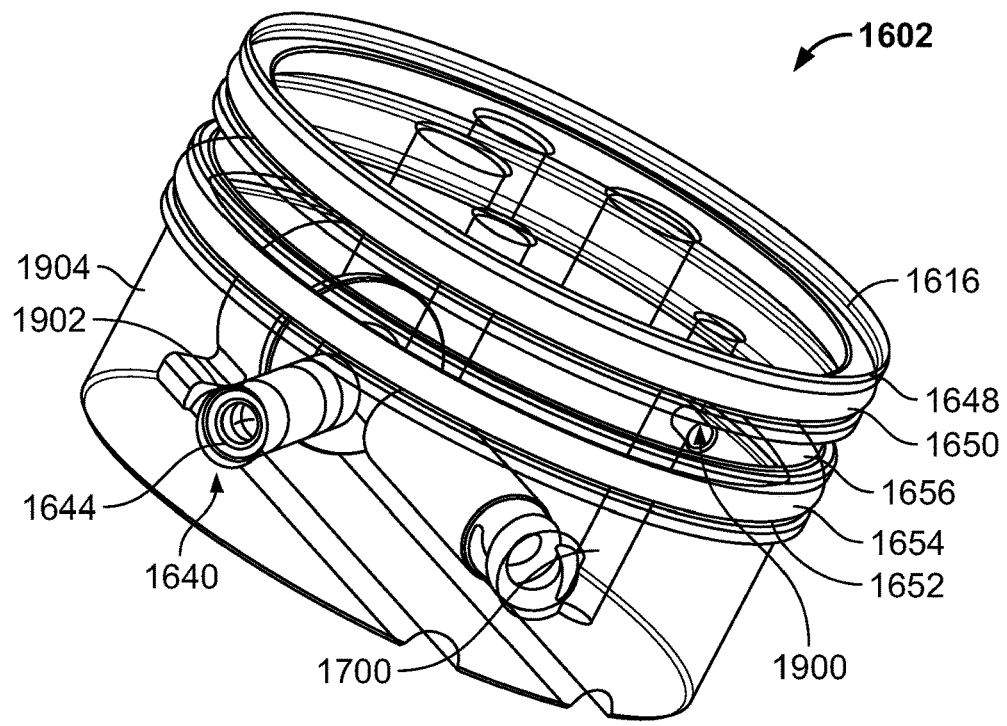
FIG. 19 is a perspective view of the example parking brake valve of FIG. 16.
Figure 20:
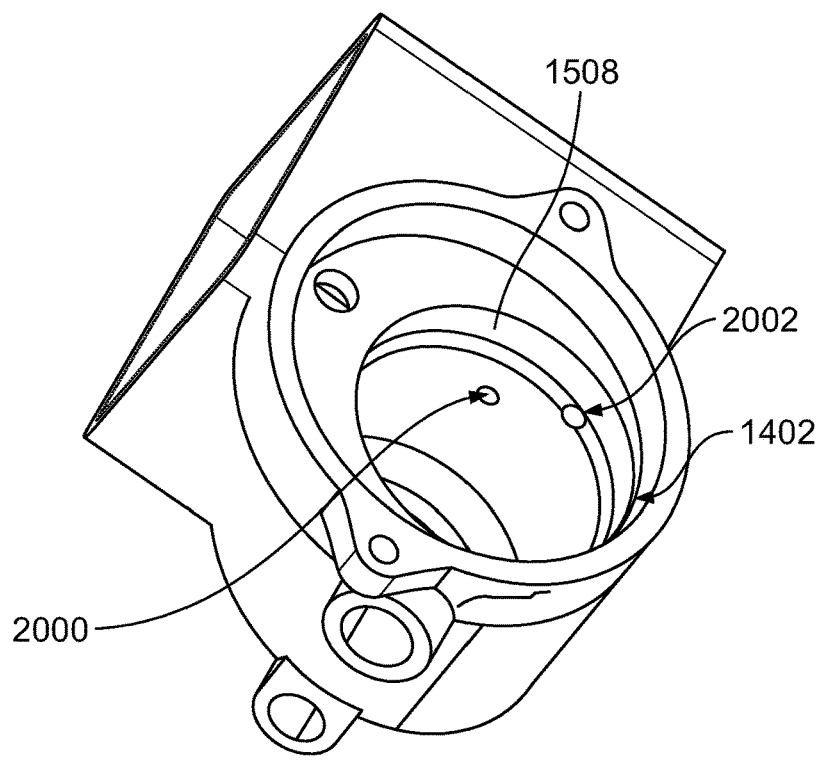
FIG. 20 is a perspective view of the example housing of FIG. 15.

As illustrated in FIGS. 16-19, the valve body 1616 includes a first seal gland 1648 in which a first seal 1650 (e.g., an o-ring) is disposed and a second seal gland 1652 in which a second seal 1654 (e.g., an o-ring) is disposed. A groove 1656 (e.g., an annulus) is formed between the first and second seal glands 1648, 1652. When the parking brake valve 1602 is disposed in the bore 1402 (FIG. 14), the first and second seal glands 1648, 1652 seal against the inner wall 1508 of the bore 1402, such that the groove 1656 and the inner wall 1508 (FIG. 15) form a passageway around the valve body 1616. As illustrated in FIGS. 17-19, the valve body 1616 includes a second passageway 1700. The second spool 1632 is sealingly disposed in the second passageway 1700 and slidable in the second passageway 1700. As illustrated more clearly in FIG. 19, the second passageway 1700 extends between a second inlet 1900 and the first passageway 1624 (FIG. 17). In the illustrated example of FIG. 19, the second inlet 1900 is disposed in the groove 1656. As illustrated in FIG. 20, the inner wall 1508 includes a first opening 2000 and a second opening 2002. The first opening 2000 is disposed at a lower height or level in the bore 1402 than the second opening 2002. When the parking brake valve 1602 (FIG. 19) is disposed in the bore 1402, the first opening 2000 is aligned with the groove 1656 (FIG. 19). The second opening 2002 is aligned with the reservoir fluid in the upper section of the bore 1402. In particular, the second opening 2002 is in fluid communication with the reservoir fluid entering the housing 1400 (FIG. 14) through the reservoir inlet 1410 (FIG. 14).

Figure 21:
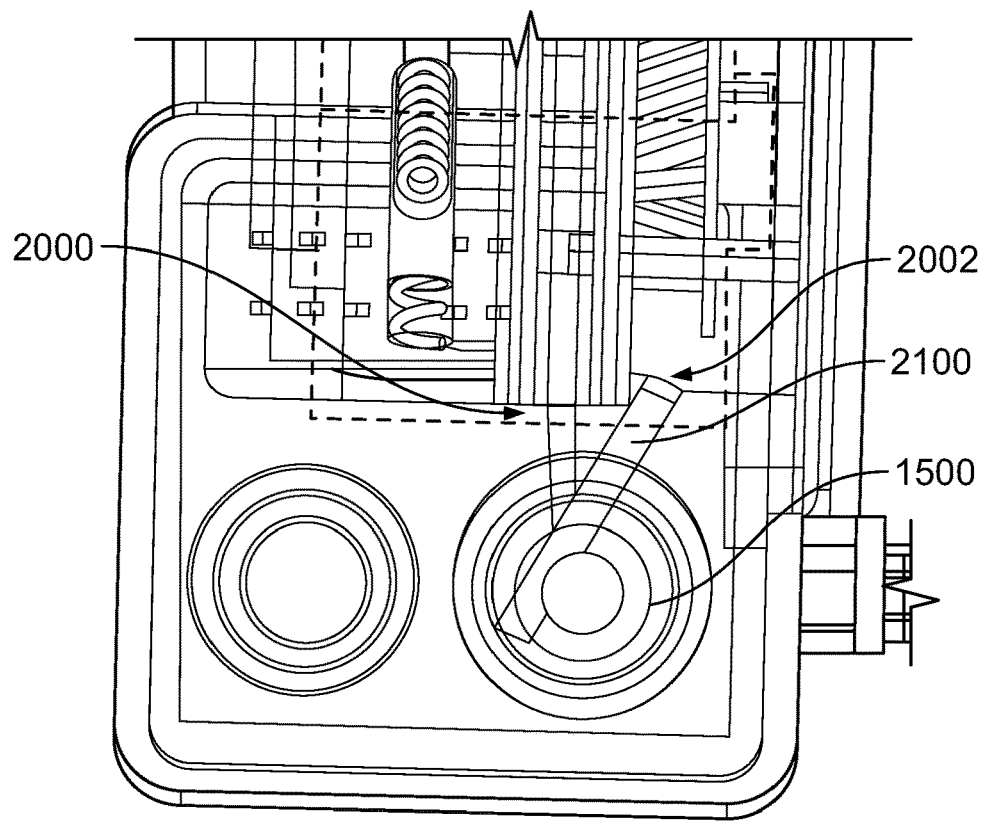
FIG. 21 is a side view of the example hydraulic brake apparatus of FIG. 13.

As illustrated in FIG. 21, a 2100 passageway is formed between the first opening 2000 and the second opening 2002. The solenoid valve 1500 is disposed within the passageway 2100 connecting the first opening 2000 to the second opening 2002. The solenoid valve 1500 operates between an open position (a first position) and a closed position (a second position). When the solenoid valve 1500 is in the open position, fluid is able to flow between the second passageway 1700 (FIGS. 17 and 19) (through the groove 1656) and the reservoir fluid. Thus, the fluid in the second passageway 1700 (FIGS. 17 and 19) is vented to low pressure. When the solenoid valve 1500 is in the closed position, fluid in the second passageway 1700 (FIGS. 17 and 19) is blocked from flowing through the solenoid valve 1500 to the reservoir fluid. The combination of the second passageway 1700 (FIGS. 17 and 19), the groove 1656 (FIGS. 17 and 19), and the passageway 2100 forms a passageway that extends from the first passageway 1624 (FIGS. 16 and 17) to the reservoir fluid, similar to the second passageway 604 of FIG. 6, which extends between the first passageway 600 and the reservoir 206.

Similar to the example hydraulic brake apparatus 100 disclosed above, the example hydraulic brake apparatus 1300 (FIG. 13) is operable to apply/relieve braking pressure at the caliper 1302 (FIG. 13) in a braking mode and operable to lock fluid in the caliper 1302 in a parking brake mode. In the braking mode, the solenoid valve 1500 (FIGS. 15 and 21) is in the closed position, such that fluid is blocked from passing from the second passageway 1700 (FIGS. 17 and 19) to the reservoir fluid in the upper part of the bore 1402 (FIG. 14). To apply braking pressure to the caliper 1302 (FIG. 13), the motor 1406 (FIG. 14) is activated to drive the pump 1600 (FIG. 16), which directs high pressure fluid through the first passageway 1624 (FIGS. 16 and 17) to the outlet 1626 (FIGS. 16 and 17), where the fluid is supplied to the caliper 1302 (FIG. 13). To relieve braking pressure at the caliper 1302 (FIG. 13), the motor 1406 (FIG. 14) is activated to drive the pump 1600 (FIG. 16) in the opposite direction, thereby drawing fluid from the first passageway 1624 (and the caliper 1302) (FIGS. 16 and 17) and directing the fluid back to the reservoir inlet 1410 (FIG. 14). In the braking mode, the shuttle 1628 remains in the open position, as illustrated in FIG. 17, because the pressure on both sides of the second spool 1632 is balanced. To balance the pressure across the second spool 1632, the shuttle 1628 includes an orifice 1702 (FIG. 17) (e.g., a small passageway) that extends through the shuttle 1628 and fluidly couples the first passageway 1624 and the second passageway 1700. In particular, the orifice 1702 creates a flow path that bypasses the second spool 1632. The fluid in the first passageway 1624 flows through the orifice 1702 into the second passageway 1700 (and into groove 1656 and the first opening 2000 (FIG. 20)), which is blocked by the solenoid valve 1500. Thus, the pressure on both sides of the second spool 1632 balances. As a result, the shuttle 1628 does not move.

If the parking brake mode is requested, the hydraulic brake apparatus 1300 (FIG. 13) operates in a parking brake setting mode. In the parking brake setting mode, the solenoid valve 1500 (FIG. 15) is opened, which allows the fluid in the second passageway 1700 (FIGS. 17 and 19) to flow to the reservoir. The motor 1406 (FIG. 14) is activated to drive the pump 1600 (FIG. 16) to direct high pressure fluid through the first passageway 1624 to the outlet 1626, as illustrated in FIG. 17. The high pressure fluid in the first passageway 1624 also flows through the orifice 1702 to the second passageway 1700. The pressure drop across the orifice 1702 results in a higher pressure on one side of the second spool 1632 (the side facing the first passageway 1624) than the other side of the second spool 1632 (the side facing the second passageway 1700). As a result, the shuttle 1628 moves to the closed position shown in FIG. 18, where the first spool 1630 engages the seat ring 1636 in the first passageway 1624 and blocks fluid flow through the first passageway 1624 between the first inlet 1618 and the outlet 1626. Thus, high pressure fluid is locked at the outlet 1626 and the caliper 1302 (FIG. 13).

Figure 22:
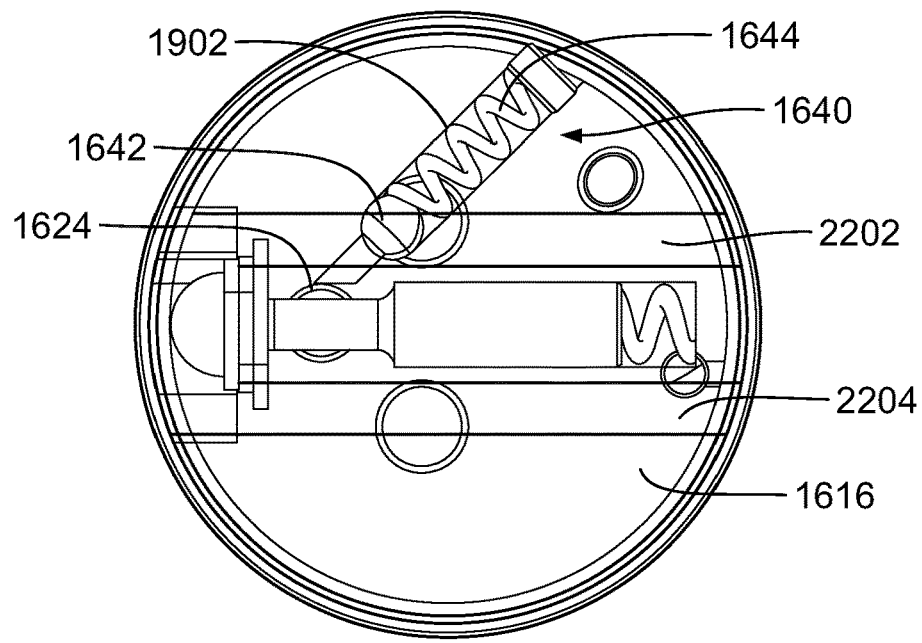
FIG. 22 is a bottom view of the example parking brake valve of FIG. 16.

To increase the pressure at the outlet 1626, the pump 1600 (FIG. 16) continues to direct high pressure fluid into the first inlet 1618, which flows through the check valve 1640 (FIG. 16). As illustrated in FIGS. 19 and 22, the check valve 1640 is disposed within a bypass passageway 1902 (e.g., a third passageway) that connects the first passageway 1624 to an outer wall 1904 of the valve body 1616. The high pressure fluid in the first passageway 1624 overcomes the force of the spring 1644, thereby moving the plug 1642 and allowing the fluid to flow to the outside of the valve body 1616.

Figure 23:
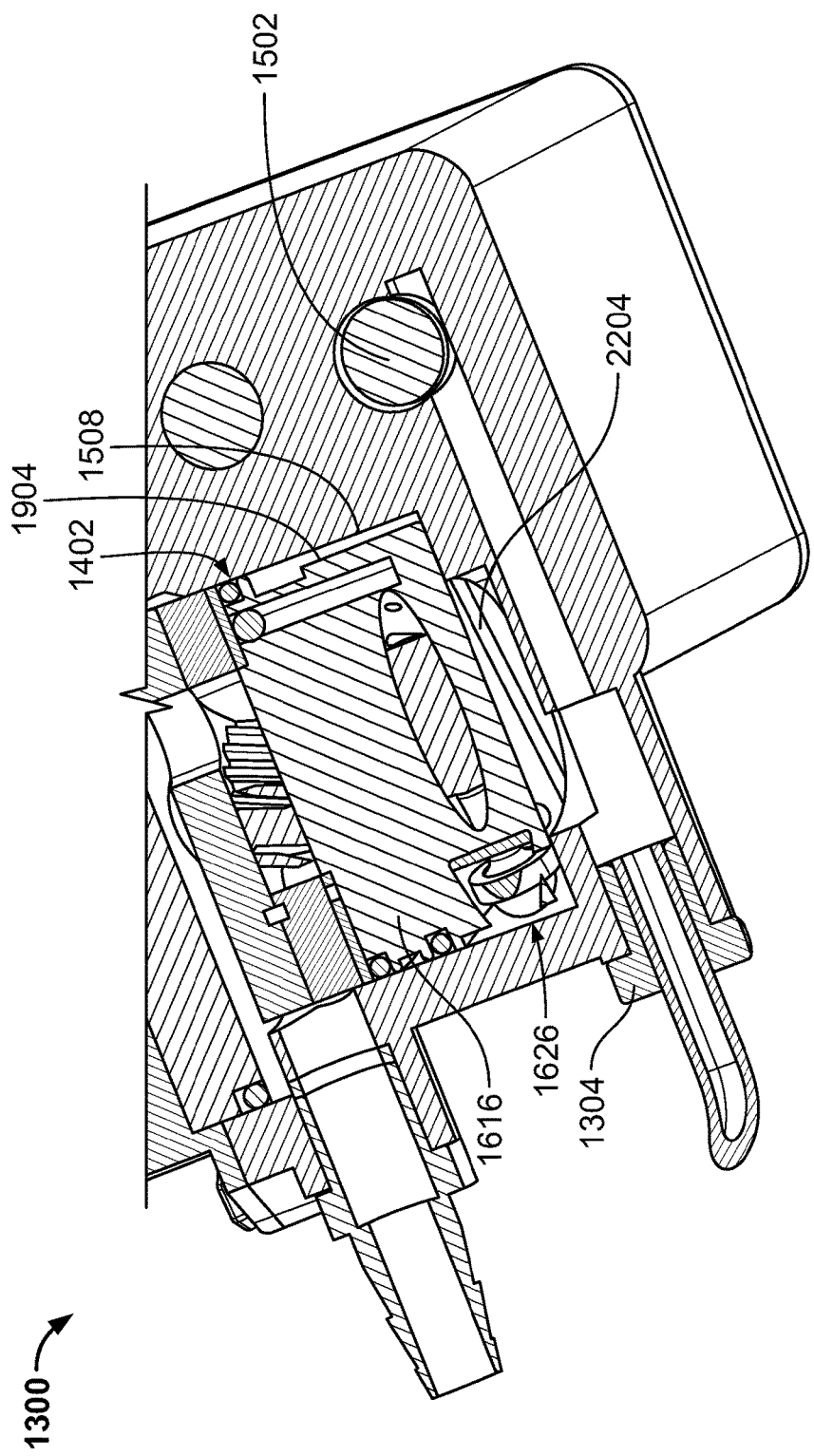
FIG. 23 is a cross-sectional view of the example hydraulic brake apparatus of FIG. 13 taken along line B-B of FIG. 13.

As shown in the cross-sectional view of FIG. 23, the outer wall 1904 of the valve body 1616 is spaced away from the inner wall 1508 of the bore 1402. The pressure of the fluid around the outer wall 1904 of the valve body 1616 is the same as the pressure at the outlet 1626. Fluid flows out of the bypass passageway 1902 (FIGS. 16, 19 and 22) and between the outer wall 1904 of the valve body 1616 and the inner wall 1508 of the bore 1402. As illustrated in FIG. 22, a first groove 2202 and a second groove 2204 are formed in the bottom of the valve body 1616 and extend across the valve body 1616. In other examples, more or fewer grooves may be implemented. Referring back to FIG. 23, the fluid between the outer wall 1904 and the inner wall 1508 flows down to the first and second grooves 2202, 2204, and through the first and second grooves 2202, 2204 to the outlet 1304. As illustrated in FIG. 23, the pressure sensor 1502 is fluidly coupled to the outlet 1304 to measure the fluid pressure applied to the caliper 1302 (FIG. 13). The pump 1600 (FIG. 16) continues to pump high pressure to the outlet 1304 (which is at the same pressure as the outlet 1626 of the parking brake valve 1602 (FIG. 16)) until the target pressure is reached (as detected by the pressure sensor 1502).

When the target pressure is reached at the outlet 1304, the hydraulic brake apparatus 1300 is switched to the parking brake mode. In the parking brake mode, the pump 1600 (FIG. 16) is deactivated. As a result, the check valve 1640 (FIG. 16) closes, thereby locking the high pressure fluid at the outlet 1304 and, thus, in the caliper 1302 (FIG. 13). Additionally, the solenoid valve 1500 (FIG. 15) is closed, thereby preventing fluid flow through the second passageway 1700 (FIGS. 17 and 19) to the reservoir. Referring back to FIG. 18, the fluid in the first passageway 1624 flows through the orifice 1702 into the second passageway 1700 until the pressure balances. As a result, the pressure on both sides of the second spool 1632 is substantially the same, which is substantially less than the pressure at the outlet 1626. The higher pressure fluid at the outlet 1626 (acting on one side of the first spool 1630) maintains the shuttle 1628 in the closed position.

To release or deactivate the parking brake mode, the hydraulic brake apparatus 1300 (FIG. 13) is switched to a parking brake release mode. In the parking brake release mode, the pump 1600 (FIG. 16) is activated to direct high pressure fluid into the first inlet 1618. Referring to FIG. 18, when the pressure in the first passageway 1624 reaches a sufficient level, the combination of the pressure in the first passageway 1624 and the pressure from the spring 1638 overcomes the pressure at the outlet 1626, which causes the shuttle 1628 to move to the open position (to the left in FIG. 18). Once the shuttle 1628 is in the open positon, the pressure in the first passageway 1624 and the pressure at the outlet 1626 balances. The fluid can then be pumped back into the reservoir to relieve the pressure in the caliper 1302 (FIG. 13). At this point, the hydraulic brake apparatus 1300 can again operate in the brake mode or be switched to the parking brake mode, as disclosed above.

Figure 24:
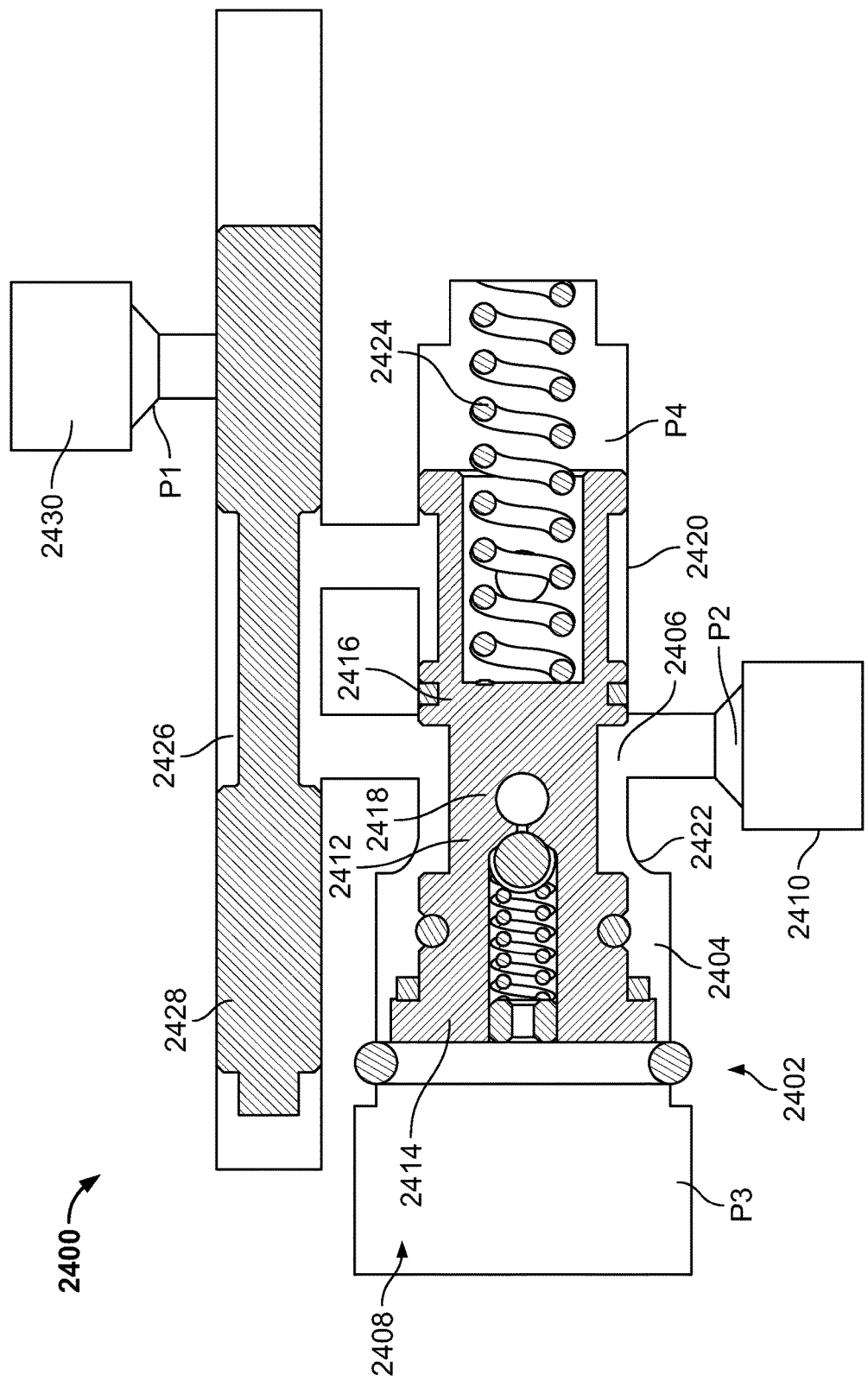
FIG. 24 is a schematic of another example hydraulic park brake apparatus that may be implemented with a brake and constructed in accordance with the teachings of this disclosure.

FIG. 24 illustrates a schematic of another example hydraulic brake apparatus 2400. Similar to the hydraulic brake apparatus 100 and 1300 disclosed above, the hydraulic brake apparatus 2400 may be used to supply braking pressure to a caliper. In the illustrated example, the hydraulic brake apparatus 2400 includes a parking brake valve 2402 having a first passageway 2404 between an inlet 2406 and an outlet 2408, which is to be fluidly coupled to a caliper (e.g., the caliper 122). A pump 2410 is in fluid communication with the inlet 2406. The pump 2410 directs fluids into the first passageway 2404 to apply braking pressure at the outlet 2408 or draws fluid out of the first passageway 2404 to relieve braking pressure at the outlet 2408. The pump 2410 obtains fluid from a fluid reservoir (e.g., such as a reservoir 2430).

In the illustrated example, the parking brake valve 2402 includes a shuttle 2412 that is movable in the first passageway 2404. In the illustrated example, the shuttle 2412 includes a first spool 2414 and a second spool 2416 coupled by a stem 2418. The second spool 2416 is sealingly engaged with an inner wall 2420 of the first passageway 2404 and separates the fluid on either side of the second spool 2416. The shuttle 2412 is movable between an open position (the position shown in FIG. 24) and a closed position. In the open position, fluid can flow through the first passageway 2404 between the inlet 2406 and the outlet 2408. In the closed position, the shuttle 2412 is moved to the right in FIG. 24, and the first spool 2414 engages a seat 2422 to block fluid from flowing through the first passageway 2404 between the inlet 2406 and the outlet 2408. The shuttle 2412 is biased to the open position via a spring 2424.

In the illustrated example, a second passageway 2426 fluidly couples the first passageway 2404, on the left side of the second spool 2416, to the first passageway 2404 on the right side of the second spool 2416. A solenoid valve 2428 is disposed in the second passageway 2426. The solenoid valve 2428 is movable between an open position (the position illustrated in FIG. 24) and a closed position. In the open position, fluid is able to flow through the second passageway 2426 between the two sides of the second spool 2416. In the closed position, fluid is blocked from flowing through the second passageway 2426 between the two sides of the second spool 2416. In the illustrated example, the reservoir 2430 is fluidly coupled to the second passageway 2426. In the open position, the solenoid valve 2428 blocks the reservoir 2430 from the second passageway 2426. In the closed position, the solenoid valve 2428 enables fluid to flow in the second passageway 2426 between the reservoir 2430 and the backside of the second spool 2416. In the illustrated example, the pressure of the reservoir 2430 is labeled as P1, the pressure at the pump 2410 is labeled as P2, the pressure at the outlet 2408 is labeled as P3, and the pressure behind the second spool 2416 is labeled as P4.

Similar to the hydraulic brake apparatus 100 and 1300 disclosed above, the hydraulic brake apparatus 2400 operates between a braking mode and a parking brake mode. In FIG. 24, the hydraulic brake apparatus 2400 is in the braking mode. In the braking mode, the solenoid valve 2428 is in the open position, such that the pressure on both sides of the second spool 2416 is balanced. To apply braking pressure at the outlet 2408 (and to a brake), the pump 2410 is activated to direct high pressure fluid into the inlet 2406, which flows through the first passageway 2404 to the outlet 2408. To relieve braking pressure, the pump 2410 is activated in the opposite direction to draw fluid from the first passageway 2404 to decrease pressure at the outlet 2408. Thus, the pressure P3 is the same as the pressure P2. Additionally, because the solenoid valve 2428 is in the open position, the pressure P4 is the same as the pressures P2 and P3. Therefore, the pressure P2 and the pressure P4 are the same and the shuttle 2412 is balanced and, thus, the shuttle 2412 remains in the open position.

Figure 25:
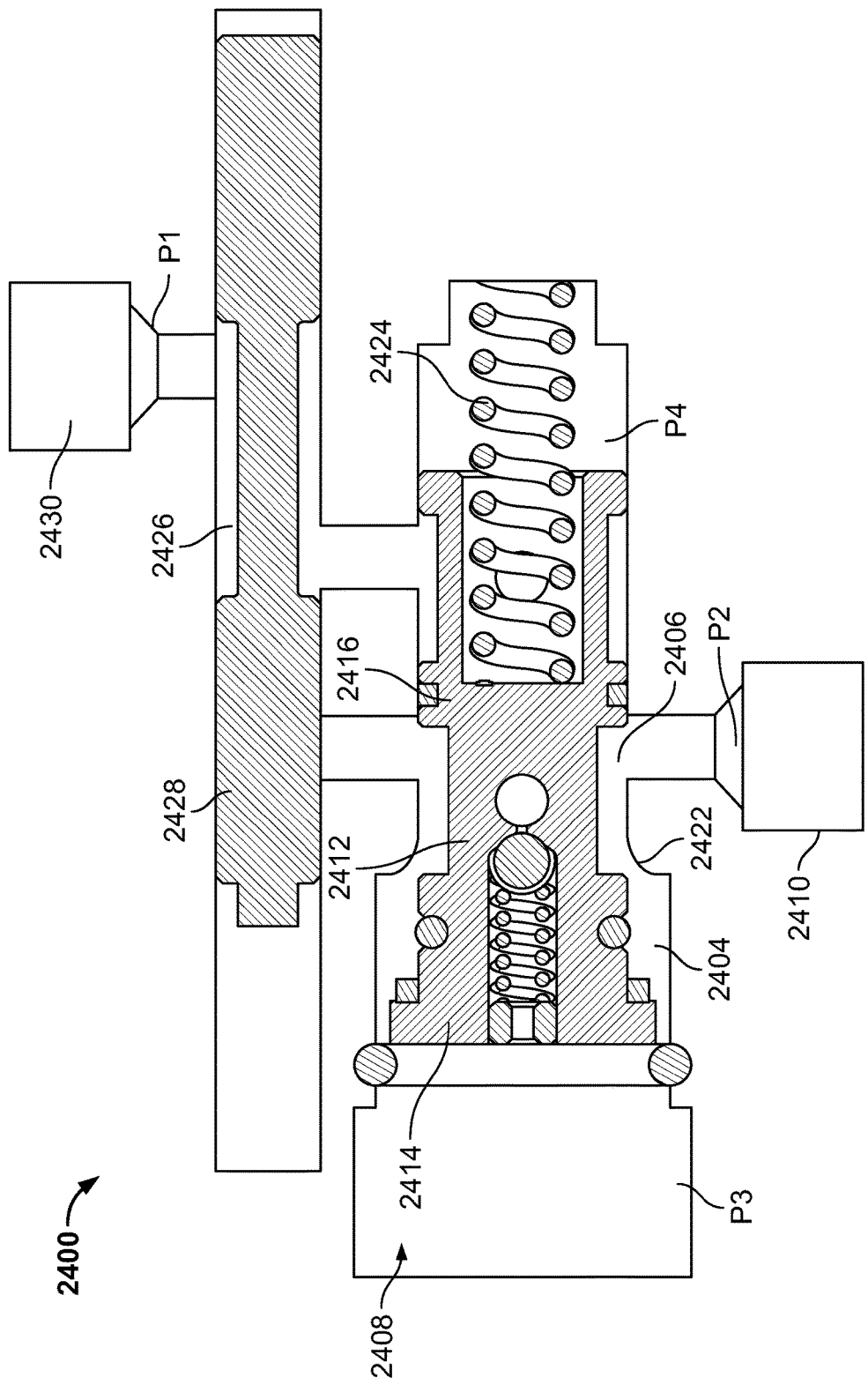
FIG. 25 illustrates the example hydraulic brake apparatus of FIG. 24 in a parking brake setting mode in which an example shuttle is in an open position.
Figure 26:
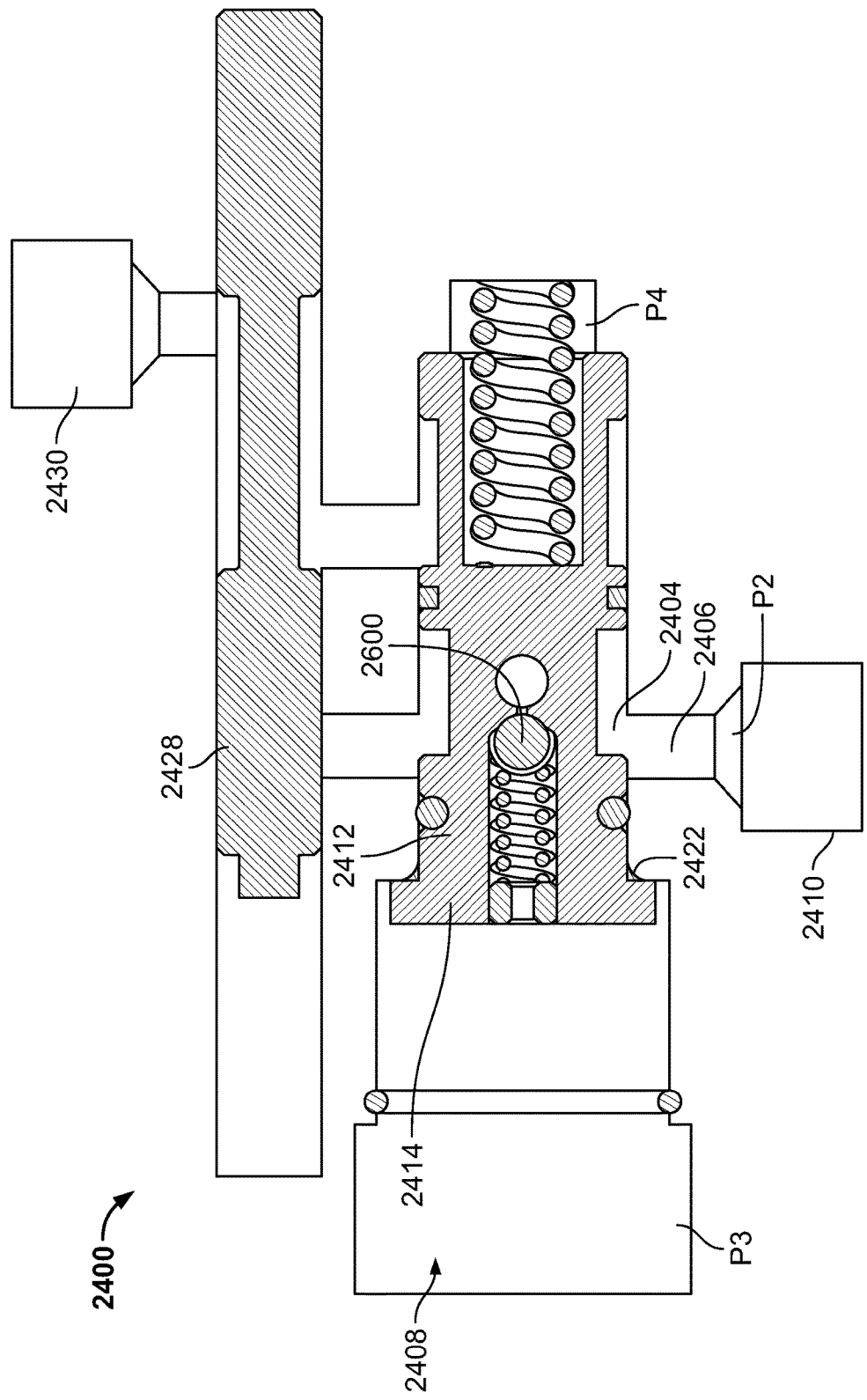
FIG. 26 illustrates the example hydraulic brake apparatus of FIG. 25 in which the example shuttle in a closed position.

If the parking brake mode is requested, the hydraulic brake apparatus 2400 operates in a parking brake setting mode, as illustrated in FIG. 25. In the illustrated example, the solenoid valve 2428 is moved to the closed position (to the right in FIG. 25). As a result, fluid flow in the second passageway 2426 between the two sides of the second spool 2416 is blocked. Instead, the reservoir 2430 is fluidly coupled to the area behind the shuttle 2412 (on the right side of the second spool 2416 in FIG. 25). The pump 2410 is activated to direct high pressure fluid through the inlet 2406 into the first passageway 2404, which flows to the outlet 2408. The pressure P2 becomes higher than the pressure P4, which is vented to P1 (atmospheric pressure). When the pressure P2 overcomes the pressure P4 (plus the force of the spring 2424), the shuttle 2412 moves to closed position (to the right in FIG. 25). In particular, the pressure P2 on the left side of the second spool 2416 becomes higher than the pressure P4 (or P1) on the right side of the second spool 2416. When the shuttle 2412 moves to the closed position (to the right in FIG. 25), the first spool 2414 engages the seat 2422 in the first passageway 2404, as illustrated in FIG. 26. In the illustrated example of FIG. 26, high pressure fluid is locked at the outlet 2408 (and, thus, in the caliper). To increase the pressure at the outlet 2408, the pump 2410 continues to pump high pressure fluid through the inlet 2406, which flows through a check valve 2600 to the outlet 2408. In the illustrated example, the check valve 2600 is disposed in the shuttle 2412. The check valve 2600 opens to allow fluid to flow from the first passageway 2404 (on right side of the first spool 2414) to the outlet 2408, thereby bypassing the first spool 2414. The pump 2410 continues to pump high pressure fluid through the check valve 2600 to bring the pressure P3 to the target pressure.

Figure 27:
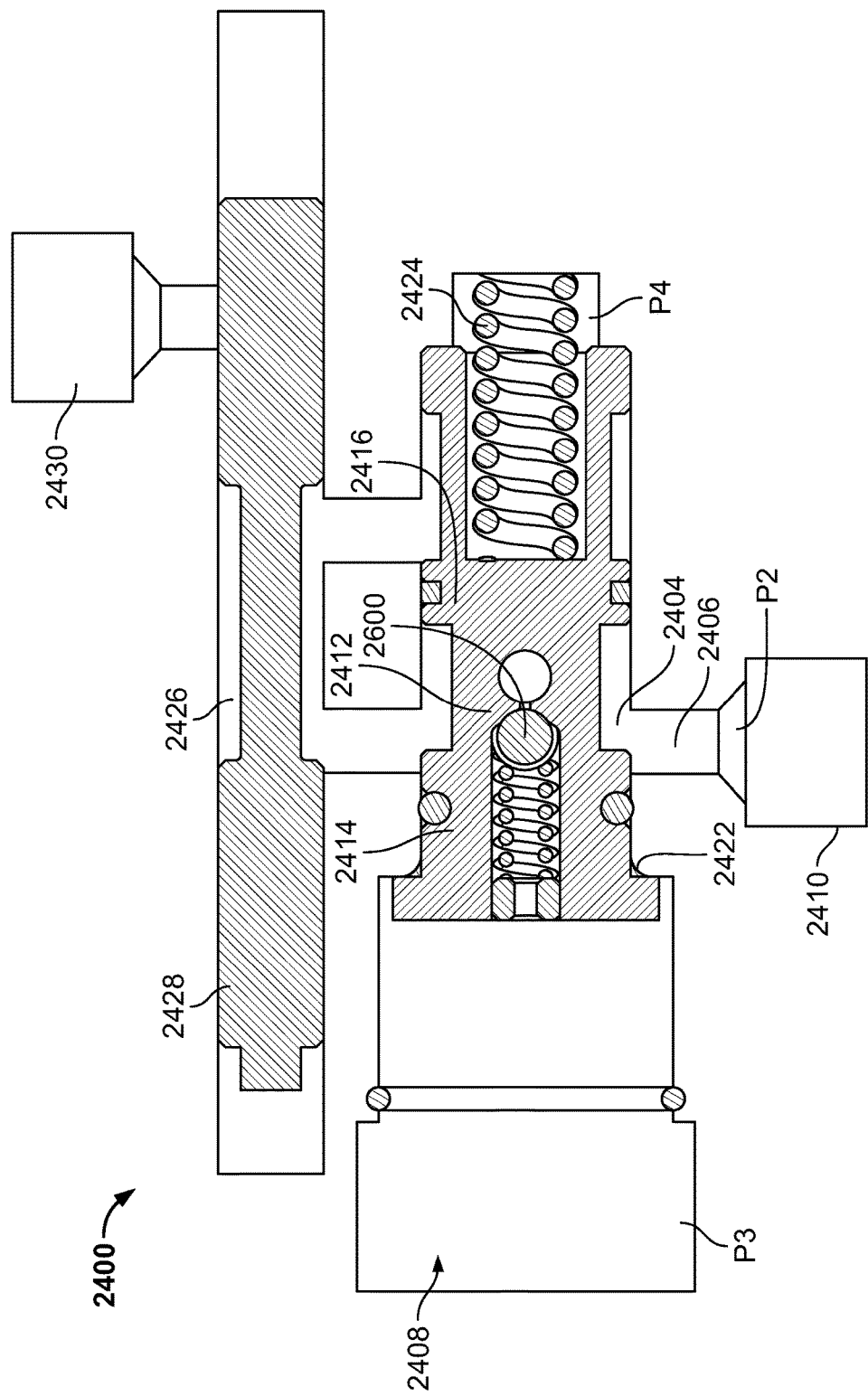
FIG. 27 illustrates the example hydraulic brake apparatus of FIG. 24 in a parking brake mode.

When the target pressure is reached at the outlet 2408, the hydraulic brake apparatus 2400 is switched to the parking brake mode, as illustrated in FIG. 27. In the parking brake mode, the pump 2410 is deactivated. As a result, the check valve 2600 closes, thereby locking the high pressure fluid at the outlet 2408 and, thus, in the caliper. Additionally, the solenoid valve 2428 is moved to the open position (back to the left in FIG. 27), where the second passageway 2426 fluidly couples the two sides of the second spool 2416. Thus, the pressure on the sides of the second spool 2416 balances. The pressure P3 at the outlet 2408 is greater than the pressure P2 and P4. As a result, the shuttle 2412 remains in the closed position and the high pressure fluid is locked at the outlet 2408.

To release or deactivate the parking brake mode, the pump 2410 is activated to pump high pressure fluid through the inlet 2406 into the first passageway 2404. When the pressure P2 (plus the pressure of the spring 2424) is greater than the pressure P3, the shuttle 2412 moves to the open position (to the left in FIG. 27). The first spool 2414 moves away from the seat 2422, which enables P2 and P3 to balance. The fluid can then be drawn from the first passageway 2404 by the pump 2410 (to relieve braking pressure). At this point, the hydraulic brake apparatus 2400 can again operate in the brake mode or be switched to the parking brake mode, as disclosed above.

In the example hydraulic brake apparatus 2400 of FIGS. 24-27, the solenoid valve 2428 operates to fluidly connect both sides of the second spool 2416 and to connect the back side of the second spool 2416 to the reservoir 2430. In other examples, two separate valves may be implemented. For example, one valve may be implemented in a passageway between the two sides of the second spool 2416, and another valve may be disposed in a passageway connecting the backside of the second spool 2416 to the reservoir 2430. Further, while the check valve 2600 (FIGS. 26 and 27) of the example hydraulic brake apparatus 2400 is disposed in the shuttle 2412, in other examples the check valve may be disposed in a bypass passageway between the two sides of the first spool 2414 (e.g., similar to the bypass passageway 612 of FIG. 6).

While the hydraulic brake apparatus 100, 1300, 2400 are described in connection with a caliper type brake, it is understood that the example hydraulic brake apparatus 100, 1300, 2400 may be similarly implemented with any other type of brake device/system that requires pressurized fluid to apply a braking force. In some examples, anti-lock brake (ABS) controls and/or wheel speed sensor (WSS) inputs are integrated with the hydraulic brake apparatus 100, 1300, 2400. The example hydraulic brake apparatus 100, 1300, 2400 can be utilized with current brakes by replacing the current hydraulic system with the example hydraulic brake apparatus 100, 1300, 2400.

Further, the example hydraulic brake apparatus 100, 130, 2400 can also be implemented on different types of vehicles. For example, the hydraulic brake apparatus 100 may be implemented on a trailer, which is advantageous because fluid lines are not required to be connected between the towing vehicle and the trailer. Instead, the ECU of the tow vehicle can communicate with the hydraulic brake apparatus 100 (e.g., with the ECU 212) to instruct braking commands. Further, the example hydraulic brake apparatus 100 provides parking brake functionality to the trailer without the need expensive air brakes.

In another example, the hydraulic brake apparatus 100, 1300, 2400 may be implemented on a railway car. Railway cars typically receive air pressure and/or power from an adjacent car. If the railway car separates from the adjacent car, braking pressure is applied to stop the railway car. Thus, the brakes on a railway car operate in reverse. In other words, fluid pressure is applied to keep the brakes open. The example hydraulic brake apparatus 100, 1300, 2400 can be modified to work in reverse, i.e., apply pressure to keep the brakes open. Further, the ECU 212 for controlling the hydraulic brake apparatus 100, 1300, 2400 can be modified to operate on air pressure and, thus, no electrical connection may be needed. In some examples, individual batteries may be provided on the railway cars.

In some examples, asymmetric braking can be performed by two of the hydraulic brake apparatus 100, 1300, 2400. For example, a first hydraulic brake apparatus associated with the left rear wheel can apply a different braking pressure than a second hydraulic brake apparatus associated with the right rear wheel, which improves stability and cornering. This capability is also not possible with traditional braking systems that apply the same pressure to all of the brakes. Also, because the hydraulic brake apparatus 100, 1300, 2400 may be implemented as stand-alone devices (e.g., with separate motors, pumps, reservoirs, etc.), a failure of one device does not affect the operation of the other device. Thus, if one of the devices becomes inoperable, the other devices can still providing braking functions to the vehicle.

Figure 28:
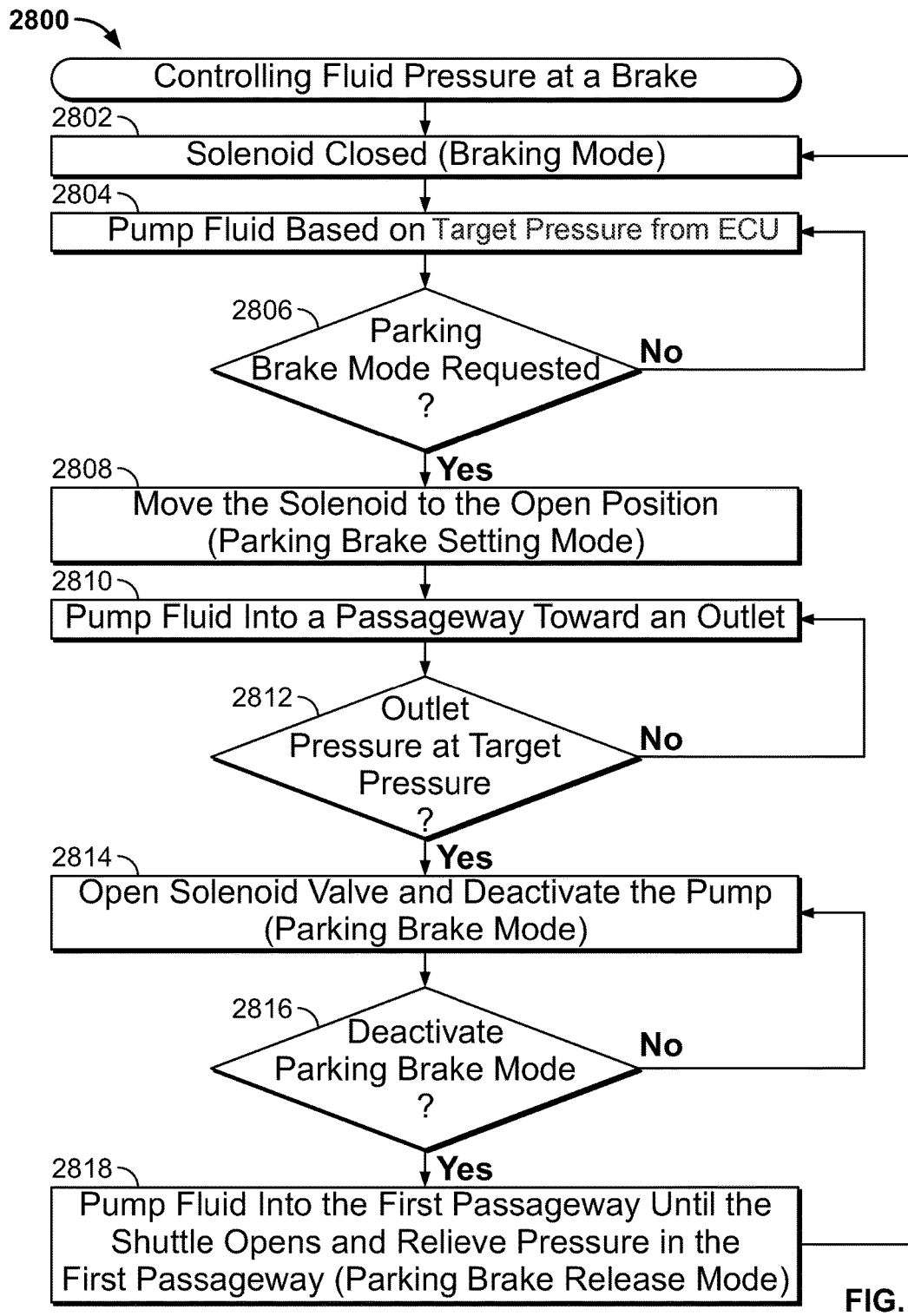
FIG. 28 is a flowchart representative of an example method for controlling fluid pressure at a brake as implemented by the example hydraulic brake apparatus of FIGS. 1, 13 and 24.

FIG. 28 is a flowchart representative of an example method 2800 to control fluid pressure at a brake (e.g., a caliper). The example method 2800 is described in connection with the hydraulic brake apparatus 100. However, the method 2800 may be similarly performed with the other hydraulic brake apparatus 1300, 2400.

At block 2802, the hydraulic brake apparatus 100 operates in the braking mode. In some examples, the particular mode or state is instructed by the ECU 212. In the braking mode, the solenoid valve 624 is in the closed position, so that the pressures in the first passageway 600 and the second passageway 604 are balanced. As a result, the shuttle 512 remains in the open position.

At block 2804, the pump 208 directs fluid into the caliper 102 or draws fluid out of the caliper 102 based on a target brake pressure from the ECU 218. The target pressure may be based on a pressured determined by or more critical safety systems, a position of a brake pedal, etc. The PID controller 213 controls the motor 214 to drive the pump 208 based on the difference between target pressure and the actual pressure (as measured by the pressure sensor 216).

At block 2806, the ECU 212 determines whether a parking brake request is received (e.g., a request to place the hydraulic brake apparatus 100 in the parking brake mode). A parking brake request may be initiated by the parking brake switch 220, for example. If no parking brake request is received, the hydraulic brake apparatus 100 continues to operate in the braking mode (at block 2804). If a parking brake request is received, the ECU 212 switches the hydraulic brake apparatus 100 in the parking brake setting mode (at block 2808) in which the solenoid valve 624 is moved to the open position to vent the second passageway 604 to the reservoir 206.

At block 2810, the ECU 212 controls the motor 214 to drive the pump 208 to direct fluid into the first passageway 600 toward the outlet 104. As disclosed above, the shuttle 512 moves to the closed position when the pressure difference across the second spool 616 (generated by the orifice 700) overcomes the pressure of the spring 622. Once the shuttle 512 is in the closed position, fluid is routed through the check valve 514 to the outlet 104. At block 2812, the ECU 212 determines whether the pressure at the outlet 104 (as detected by the pressure sensor 216) meets or satisfies the target pressure. If the target pressure is not reached, the pump 208 continues to direct high pressure fluid to the outlet 104 (block 2810).

If the target pressure is reached, the ECU 212 switches the hydraulic brake apparatus 100 into the parking brake mode (e.g., a locked position). In particular, at block 2814, the solenoid valve 624 is closed, thereby blocking fluid in the second passageway 604 and balancing the pressure across the second spool 616 of the shuttle 512. As a result, high pressure fluid is locked at the outlet 104 and, thus, in the caliper 102. The hydraulic brake apparatus 100 can remain in the parking brake mode as long as desired.

At block 2816, the ECU 212 determines if a request to deactivate the parking brake mode is received (e.g., by disengaging the parking brake switch 220). If a request to deactivate has not been received, the hydraulic brake apparatus 100 continues to lock the high pressure fluid in the caliper 102 in the parking brake mode (at block 2814). If a request to deactivate is received, the ECU 212 switches the hydraulic brake apparatus 100 into a parking brake release mode (block 2818). In the parking brake release mode, the ECU 212 activates the pump 208 to direct fluid into the first passageway 600. Eventually, the pressure in the first passageway 600 (plus the pressure of the spring 622) overcomes the pressure at the outlet 104 and the shuttle 512 moves to the open positon, at which point the pressures in the first passageway 600 and the outlet 104 balance. The pump 208 can then be activated to draw fluid out of the first passageway 600 and relieve the braking pressure at the outlet 104. In this configuration, the hydraulic brake apparatus 100 is the braking mode and can operate to apply braking force in the braking mode (block 2804) or can switch to the parking brake mode (block 2806).

From the foregoing, it will be appreciated that the above disclosed hydraulic brake apparatus provide braking and parking brake capabilities without the need for lengthy fluid lines and mechanical parking brake levers and cables as seen in traditional braking systems. The example hydraulic brake apparatus disclosed herein provide relatively high braking pressure, which is advantageous to larger vehicles such as, for example, heavy duty trucks, where electric parking brake systems are insufficient to provide adequate braking force. The example hydraulic brake apparatus can operate in a normal braking mode to apply braking pressure or relieve braking pressure. The example hydraulic brake apparatus can also operate in a parking brake mode to lock high pressure fluid in a brake. In some examples, the hydraulic brake apparatus are stand-alone devices that may be coupled directly to a brake. An ECU of the vehicle communicates with the hydraulic brake apparatus to apply braking pressure as desired. Thus, all the brake hosing lines and mechanical cables from the front of the vehicle to the respective brake can be eliminated, thereby decreasing the weight of the vehicle, decreasing manufacturing costs, and decreasing maintenance costs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus comprising:
a parking brake valve including:
a first passageway between a first inlet and an outlet, the first inlet to be in fluid communication with a pump, the outlet to be fluidly coupled to a vehicle brake;
a second passageway between a second inlet and the first passageway, the second inlet to be in fluid communication with a reservoir;
a shuttle having a first spool and a second spool, the second spool disposed in the second passageway and blocking fluid flow between first passageway and the second passageway, the shuttle movable between an open position in which the first spool allows fluid flow between the first inlet and the outlet and a closed position in which the first spool blocks fluid flow between the first inlet and the outlet, the shuttle having an orifice across the second spool fluidly connecting the first passageway to the second passageway; and
a check valve to allow fluid flow from the first inlet to the outlet when the shuttle is in the closed position.
2. The apparatus of claim 1, wherein the parking brake valve further includes a third passageway between the first inlet and the outlet, the check valve disposed in the third passageway.
3. The apparatus of claim 1 further including a fluid level sensor to detect a level of fluid in the reservoir.
4. The apparatus of claim 1 further including the pump, wherein the pump is a bi-directional gear pump.

5. The apparatus of claim 4, wherein the pump is operable in a first direction to supply fluid to the first passageway and a second direction to draw fluid from the first passageway.

6. The apparatus of claim 1 further including a pressure sensor to measure a fluid pressure at the outlet.

7. The apparatus of claim 1 further including a solenoid valve disposed in the second passageway.

8. The apparatus of claim 7, wherein the solenoid valve is operable between a first position to allow fluid flow between the second passageway and the reservoir and a second positon to block fluid flow between second passageway and the reservoir.

9. The apparatus of claim 1, wherein the parking brake valve further includes a spring to bias the shuttle to the open position.

10. The apparatus of claim 1, wherein an inlet of the pump is in fluid communication with the reservoir.

11. An apparatus comprising:
a pump; and
a parking brake valve having a passageway between an inlet in fluid communication with the pump and an outlet to be in fluid communication with a vehicle brake, a shuttle disposed in the passageway and movable between an open positon and a closed position, the parking brake valve operable between at least:
a braking mode in which the shuttle is in the open position and the pump is to direct fluid through the passageway between the inlet and the outlet;
a parking brake setting mode in which the shuttle is moved to the closed position by directing the fluid, with the pump, through the inlet into the passageway, wherein, in the parking brake setting mode, the pump is deactivated when a pressure of the fluid at the outlet meets a target pressure; and
a parking brake mode in which the shuttle is in the closed position and the fluid is captured at the outlet.

12. The apparatus of claim 11, wherein the parking brake valve is further operable in a parking brake release mode in which the shuttle is moved to the open position by directing the fluid, with the pump, through the inlet into the passageway.

13. The apparatus of claim 11, wherein, in the parking brake setting mode, the fluid is directed though a bypass passageway to the outlet after the shuttle is moved to the closed position.

14. The apparatus of claim 13, wherein the parking brake valve further includes a check valve disposed in the bypass passageway.

15. The apparatus of claim 11, wherein, in the braking mode, the pump is to direct fluid through the passageway based on a desired pressure from an engine control unit (ECU) of a vehicle.

16. The apparatus of claim 11, wherein the parking brake valve is switched to the parking brake setting mode based on a parking brake request.

17. An apparatus comprising:
a parking brake valve having an inlet fluidly coupled to a pump and an outlet fluidly coupled to a brake, the parking brake valve operable between an open state and a closed state to allow or block fluid through the parking brake valve, wherein, to lock the fluid in the brake in a parking brake mode, the parking brake valve is moved to the closed state by pumping fluid into the inlet, and wherein, to unlock the fluid in the brake in a parking brake release mode, the parking brake valve is moved to the open state by pumping fluid into the inlet.

* * * * *